(12) United States Patent
Zhao et al.

(10) Patent No.: US 11,949,461 B1
(45) Date of Patent: Apr. 2, 2024

(54) INTEGRATED SELF-COHERENT RECEIVING OPTICAL CHIP BASED ON ROUND-TRIP DELAY INTERFEROMETERS

(71) Applicant: BEIJING ZHONGKE GUOGUANG QUANTUM TECHNOLOGY CO., LTD., Beijing (CN)

(72) Inventors: Yibo Zhao, Beijing (CN); Dong Wang, Beijing (CN); Dongsheng Chen, Beijing (CN)

(73) Assignee: BEIJING ZHONGKE GUOGUANG QUANTUM TECHNOLOGY CO., LTD., Beijing (CN)

( * ) Notice: Subject to any disclaimer, the term of this patent is extended or adjusted under 35 U.S.C. 154(b) by 66 days.

(21) Appl. No.: 18/211,346

(22) Filed: Jun. 19, 2023

(30) Foreign Application Priority Data

Aug. 29, 2022 (CN) .......................... 202211036839.1

(51) Int. Cl.
*H04B 10/61* (2013.01)
(52) U.S. Cl.
CPC ....... *H04B 10/6151* (2013.01); *H04B 10/614* (2013.01); *H04B 10/616* (2013.01)
(58) Field of Classification Search
None
See application file for complete search history.

(56) References Cited

U.S. PATENT DOCUMENTS

| 8,503,889 | B2* | 8/2013 | Caplan ................. | H04B 10/677 398/87 |
| 2009/0196610 | A1* | 8/2009 | Isomura .................. | H04J 14/06 398/65 |
| 2009/0214201 | A1* | 8/2009 | Oda .................... | H04B 10/0795 398/25 |
| 2009/0317092 | A1* | 12/2009 | Nakashima ............ | H04B 10/65 398/204 |
| 2010/0046961 | A1* | 2/2010 | Tanimura ................. | H04B 1/12 398/208 |
| 2010/0054759 | A1* | 3/2010 | Oda .................. | H04L 25/03038 398/202 |
| 2010/0189445 | A1* | 7/2010 | Nakashima ............ | H04B 10/65 398/152 |
| 2013/0216228 | A1* | 8/2013 | Nazarathy ............. | H04J 14/002 398/79 |

* cited by examiner

*Primary Examiner* — David W Lambert
(74) *Attorney, Agent, or Firm* — COOPER LEGAL GROUP LLC

(57) ABSTRACT

The present application discloses an integrated self-coherent receiving optical chip based on round-trip delay interferometers, including a first beam splitter, a multi-port circulator array, a first round-trip delay interferometer and a second round-trip delay interferometer integrated on a same substrate, wherein the first beam splitter is connected to the multi-port circulator array, and the multi-port circulator array is connected to the first round-trip delay interferometer and the second round-trip delay interferometer, respectively.

8 Claims, 3 Drawing Sheets

US 11,949,461 B1

INTEGRATED SELF-COHERENT RECEIVING OPTICAL CHIP BASED ON ROUND-TRIP DELAY INTERFEROMETERS

CROSS-REFERENCE TO RELATED APPLICATION

This application claims priority to Chinese patent application No. 202211036839.1, filed on Aug. 29, 2022. The entirety of Chinese patent application No. 202211036839.1 is hereby incorporated by reference herein and made a part of this specification.

FIELD OF THE INVENTION

The present application relates to the technical field of optical communication, in particular to an integrated self-coherent receiving optical chip based on round-trip delay interferometers.

DESCRIPTION OF RELATED ART

Integrated optical chip technology enables coherent optical communication devices to be easily miniaturized, and large-scale applications may be realized. However, conventional coherent receiving devices need to use a laser to generate local oscillator to perform frequency mixing with signal light, which not only proposes high demand on spectrum and phase of the laser, but also increases the power consumption and complexity of the receiving end. Self-coherent detection technology does not need to use a local oscillator laser at the receiving end, but uses delay interferometers to perform delayed self-interference on the signal light, which reduces the complexity of the receiving end. Moreover, the same problem faced by self-coherent detection and coherent detection is that after the signal light is transmitted to the receiving end through the optical fiber channel, the polarization will become random, which will affect the stability of the interference result and thus affect the demodulation of the signal.

Among the commonly used solutions in the related art, one of the solutions is to use a polarization controller to calibrate the polarization state of the received signal light in real time, but this system is relatively complex and heavily depends on the polarization perturbation rate. Another one of the solutions is to use polarization diversity technology, in which the signal light is divided into two components whose polarizations are perpendicular to each other, and delayed self-interference is performed for each of the components, then the service data loaded by the signal are restored through the comparison or summation of the electrical signal. However, the polarization diversity technology requires two pairs of delay interferometers and an additional electronic processing module, which increases the complexity of the system.

BRIEF SUMMARY OF THE PRESENT APPLICATION

In view of the above defects in the prior art, the present application provides an integrated self-coherent receiving optical chip based on round-trip delay interferometers.

The technical solution of the present application is as follows:

An integrated self-coherent receiving optical chip based on round-trip delay interferometers, including a first beam splitter, a multi-port circulator array, a first round-trip delay interferometer and a second round-trip delay interferometer, which are integrated on a same substrate, wherein the first beam splitter is configured to split a signal light input to a first port of the optical chip to generate a first signal light component and a second signal light component;

the multi-port circulator array is configured to transmit the first signal light component input to a first port of the multi-port circulator array to a second port of the multi-port circulator array to be output; and transmit the second signal light component input to a fourth port of the multi-port circulator array to a fifth port of the multi-port circulator array to be output;

the first round-trip delay interferometer has a first long arm and a first short arm, the first long arm and the first short arm are configured to perform a round-trip transmission of the first signal light component input to a first port of the first round-trip delay interferometer, and perform a delayed self-interference before returning to the first port of the first round-trip delay interferometer, to generate a first interference optical signal and a second interference optical signal to be output from the first port and a second port of the first round-trip delay interferometer respectively;

the second round-trip delay interferometer has a second long arm and a second short arm, a phase difference between the second long arm and the second short arm is $\pi/2$, and the second long arm and the second short arm are configured to perform a round-trip transmission of the second signal light component input to a first port of the second round-trip delay interferometer, and perform a delayed self-interference before returning to the first port of the second round-trip delay interferometer, to generate a third interference optical signal and a fourth interference optical signal to be output from the first port and a second port of the second round-trip delay interferometer respectively;

the multi-port circulator array is further configured to transmit the first interference optical signal input to the second port of the multi-port circulator array to a third port of the multi-port circulator array, and output the first interference optical signal from a second port of the optical chip; and transmit the third interference optical signal input to the fifth port of the multi-port circulator array to a sixth port of the multi-port circulator array, and output the third interference optical signal from a fourth port of the optical chip;

the multi-port circulator array comprises a first polarization beam splitting rotator, a first optical waveguide, a second optical waveguide, a second polarization beam splitting rotator, a third polarization beam splitting rotator, a third optical waveguide, a fourth optical waveguide, a fourth polarization beam splitting rotator and non-reciprocal polarization rotation modules, each of the first optical waveguide, the second optical waveguide, the third optical waveguide, and the fourth optical waveguide comprises a non-reciprocal polarization rotation module; each of the non-reciprocal polarization rotation modules is configured to rotate a polarization state of an optical signal passing from one direction by 90° and keep a polarization state of an optical signal passing from other direction unchanged;

the first polarization beam splitting rotator is configured to perform a polarization beam splitting on the first signal light component input to one input port of the first polarization beam splitting rotator to generate a first polarization component and a second polarization component of the first signal light;

the second polarization beam splitting rotator is configured to perform a polarization beam combining on the first polarization component and the second polarization component of the first signal light passing through the non-reciprocal polarization rotation module in a forward direction, to recombine the first polarization component and the second polarization component of the first signal light into the first signal light component; and configured to perform a polarization beam splitting on the first interference optical signal to generate a first polarization component and a second polarization component of the first interference optical signal;

the first polarization beam splitting rotator is further configured to perform a polarization beam combining on the first polarization component and the second polarization component of the first interference optical signal passing through the non-reciprocal polarization rotation module in a reverse direction, to recombine the first polarization component and the second polarization component of the first interference optical signal into the first interference optical signal to be output from another input port of the first polarization beam splitting rotator;

the third polarization beam splitting rotator is configured to perform a polarization beam splitting on the second signal light component input to one input port of the third polarization beam splitting rotator to generate a first polarization component and a second polarization component of the second signal light;

the fourth polarization beam splitting rotator is configured to perform a polarization beam combining on the first polarization component and the second polarization component of the second signal light passing through the non-reciprocal polarization rotation module in a forward direction, to recombine the first polarization component and the second polarization component of the second signal light into the second signal light component; and perform a polarization beam splitting on the third interference optical signal to generate a first polarization component and a second polarization component of the third interference optical signal;

the third polarization beam splitting rotator is further configured to perform a polarization beam combining on the first polarization component and the second polarization component of the third interference optical signal passing through the non-reciprocal polarization rotation module in a reverse direction, to recombine the first polarization component and the second polarization component of the third interference optical signal into the third interference optical signal to be output from another input port of the third polarization beam splitting rotator; and wherein, a signal light E(t) received by the receiving optical chip first enters the first beam splitter to be split into a first signal light component $E_1(t)$ and a second signal light component $E_2(t)$, which satisfy $E_1(t)=E_2(t)=1/\sqrt{2}E(t)$, wherein the first signal light component enters the first port of the multi-port circulator array, is output from the second port of the multi-port circulator array, reaches a first port of the first round-trip delay interferometer for a round-trip transmission, and completes the delayed self-interference before returning to the first port of the first round-trip delay interferometer, to generate to a first interference optical signal $E_{out1}(t)$ and a second interference optical signal $E_2(t)$, which are respectively expressed as $$E_{out1}(t) = \frac{1}{2\sqrt{2}}[E(t) + E(t-\tau)]$$

$$E_{out2}(t) = \frac{1}{2\sqrt{2}}[E(t) - E(t-\tau)],$$

wherein τ refers to a delay corresponding to an arm length difference between a long arm and a short arm of a first polarization-independent delay interferometer;

the first interference optical signal is output from the first port of the first round-trip delay interferometer into which the first signal light component enters, enters the second port of the multi-port circulator array, is output from the third port of the multi-port circulator array, and is output from the second port of the optical chip; the second interference optical signal is output from the second port of the first round-trip delay interferometer, and is output from a third port of the optical chip;

a differential current signal is generated by performing a balanced detection on the first interference optical signal and the second interference optical signal respectively output from the second port and the third port of the optical chip, which is an in-phase component and is expressed as:

$$I_I(t) = \frac{R}{2}|E(t)||E(t-\tau)|\cos(\omega\tau),$$

wherein R refers to a response efficiency of a photoelectric detector, ω refers to an angular frequency of a signal light;

the second signal light component enters the fourth port of the multi-port circulator array, is output from the second port of the multi-port circulator array and reaches the first port of the second round-trip delay interferometer for a round-trip transmission, and completes the delay self-interference before returning to the first port of the second round-trip delay interferometer; with a phase difference π/2 between the second long arm and the second short arm of the second round-trip delay interferometer, the third interference optical signal $E_{out3}(t)$ and the fourth interference optical signal $E_{out4}(t)$ are respectively expressed as:

$$E_{out3}(t) = \frac{1}{2\sqrt{2}}[E(t) + jE(t-\tau)]$$

$$E_{out4}(t) = \frac{1}{2\sqrt{2}}[E(t) - jE(t-\tau)],$$

wherein τ refers to a delay corresponding to an arm length difference between the long arm and the short arm of a second polarization-independent delay interferometer, the third interference optical signal is output from the first port of the second round-trip delay interferometer into which the second signal light component enters, enters the fifth port of the multi-port circulator array, and is output from the sixth port of the multi-port circulator array, and is output from the fourth port of the optical chip; the fourth interference optical signal is output from the second port of the second round-trip delay interferometer, and is output from a fifth port of the optical chip, a differential current signal is generated by performing a balanced detection on the third interference optical signal and the fourth interference optical signal respectively output from the fourth port and the fifth port of the optical chip, which is a quadrature phase component and is expressed as:

$$I_Q(t) = \frac{R}{2}|E(t)||E(t-\tau)|\sin(\omega\tau),$$

an electrical signal of the in-phase component and an electrical signal of the quadrature phase component are synthesized into a complex signal, which is expressed as:

$$u(t) = I_I(t) + jI_Q(t) = \frac{R}{2}E(t)E^*(t-\tau),$$

the complex signal is sampled and digitized to recover electric field information of the signal light and obtain service data.

In some embodiments, the first round-trip delay interferometer includes a second beam splitter, a fifth optical waveguide, a first delayed optical waveguide, a sixth optical waveguide and a fifth polarization beam splitting rotator, wherein, the second beam splitter is configured to split the first signal light component to generate a first component and a second component with the same amplitude;

the first delayed optical waveguide is configured to delay the first component by a length of half of an arm length difference of the first round-trip delay interferometer;

two output ports of the fifth polarization beam splitting rotator are directly connected by an optical waveguide, and are configured to reflect the first component from an incident port, and change a horizontal polarization component and a vertical polarization component of the first component into a vertical polarization component and a horizontal polarization component of the first component, respectively; and configured to reflect the second component from an incident port, and change a horizontal polarization component and a vertical polarization component of the second component into a vertical polarization component and a horizontal polarization component respectively;

the second beam splitter is further configured to interfere the reflected first component and the reflected second component to generate the first interference optical signal and the second interference optical signal;

the second round-trip delay interferometer includes a third beam splitter, a seventh optical waveguide, a second delayed optical waveguide, an eighth optical waveguide, a sixth polarization beam splitting rotator and a first quarter-wave plate, wherein, an angle between a main axis of the first quarter-wave plate and the horizontal direction is 0°;

the third beam splitter is configured to split the second signal light component to generate a third component and a fourth component with the same amplitude;

the second delayed optical waveguide is configured to delay the third component by a length of half of an arm length difference of the second round-trip delay interferometer;

two output ports of the sixth polarization beam splitting rotator are directly connected by an optical waveguide, and are configured to reflect the third component from an incident port, and change a horizontal polarization component and a vertical polarization component of the third component into a vertical polarization component and a horizontal polarization component of the third component, respectively; and configured to reflect the fourth component from an incident port, and change a horizontal polarization component and a vertical polarization component of the fourth component into a vertical polarization component and a horizontal polarization component of the fourth component, respectively;

the optical waveguide directly connecting the two output ports of the sixth polarization beam splitting rotator is also provided with a first quarter-wave plate configured to increase the fourth component by $\pi/2$ phase, and not increase a phase of the third component; and the third beam splitter is further configured to interfere the reflected third component and the reflected fourth component to generate a third interference optical signal and a fourth interference optical signal.

In some embodiments, the first round-trip delay interferometer includes the second beam splitter, a ninth optical waveguide, a tenth optical waveguide, a seventh polarization beam splitting rotator and a eighth polarization beam splitting rotator, a length difference between the ninth optical waveguide and the tenth optical waveguide is half of an arm length difference of the first round-trip delay interferometer;

the second beam splitter is configured to split the first signal light component to generate the first component and the second component with the same amplitude;

two output ports of the seventh polarization beam splitting rotator are directly connected by an optical waveguide, and are configured to reflect the first component from a first input port of the seventh polarization beam splitting rotator, and change a horizontal polarization component and a vertical polarization component of the first component as the vertical polarization component and the horizontal polarization component of the first component, respectively;

two output ports of the eighth polarization beam splitting rotator are directly connected by an optical waveguide, and are configured to reflect the second component from one of the input ports of the eighth polarization beam splitting rotator, and change a horizontal polarization component and a vertical polarization component of the second component as the vertical polarization component and the horizontal polarization component of the second component, respectively;

the second beam splitter is further configured to interfere the reflected first component and the reflected second component to generate a first interference optical signal and a second interference optical signal;

the second round-trip delay interferometer includes a third beam splitter, an eleventh optical waveguide, a twelfth optical waveguide, a second quarter-wave plate, and the seventh polarization beam splitting rotator and the eighth polarization beam splitting rotator shared with the first round-trip delay interferometer, an angle between a main axis of the second quarter-wave plate and the horizontal direction is 0°;

a length difference between the eleventh optical waveguide and the twelfth optical waveguide is half of the arm length difference of the second round-trip delay interferometer;

the third beam splitter is configured to split the second signal light component to generate the third component and the fourth component with the same amplitude;

the seventh polarization beam splitting rotator is further configured to reflect the third component from a second input port of the seventh polarization beam splitting rotator, and change a horizontal polarization component and a vertical polarization component of the third component into the vertical polarization component and the horizontal polarization component third component, respectively;

the eighth polarization beam splitting rotator is further configured to reflect the fourth component from a second input port of the eighth polarization beam splitting rotator, and change a horizontal polarization component and a vertical polarization component of the fourth component into the vertical polarization component and the horizontal polarization component, respectively;

the optical waveguide directly connecting the two output ports of the eighth polarization beam splitting rotator is also provided with the second quarter-wave plate configured to increase the fourth component by π/2 phase, and not increase a phase of the third component; and the third beam splitter is further configured to interfere the reflected third component and fourth component to generate a third interference optical signal and a fourth interference optical signal.

In some embodiments, the first round-trip delay interferometer includes a ninth polarization beam splitting rotator, a thirteenth optical waveguide, a fourteenth optical waveguide, the first polarization beam splitter and a fifteenth optical waveguide, wherein, the fifteenth optical waveguide has a length equal to an arm length difference of the first round-trip delay interferometer;

the second round-trip delay interferometer includes a tenth polarization beam splitting rotator, a sixteenth optical waveguide, a seventeenth optical waveguide, the second polarization beam splitter, an eighteenth optical waveguide and a third quarter-wave plate;

the eighteenth optical waveguide has a length equal to an arm length difference of the second round-trip delay interferometer;

an angle between a main axis of the third quarter-wave plate and the horizontal direction is 0°;

a first notch groove is provided transversely through the thirteenth optical waveguide, the fourteenth optical waveguide, the sixteenth optical waveguide, and the seventeenth optical waveguide; a first half-wave plate is inserted into the first notch groove, and an angle between a main axis of the first half-wave plate and a horizontal direction is 22.5°;

the ninth polarization beam splitting rotator is configured to perform polarization beam splitting on the first signal light component to generate a first polarization beam splitting component and a second polarization beam splitting component;

the tenth polarization beam splitting rotator is configured to perform polarization beam splitting on the second signal light component to generate a third polarization beam splitting component and a fourth polarization beam splitting component;

the first half-wave plate is configured to rotate a polarization state of a passing optical signal by 45°;

the first polarization beam splitter is configured to transmit a horizontal polarization component of a first polarization beam splitting component incident from the first input port of the first polarization beam splitter to the fifteenth optical waveguide and reflect a vertical polarization component of the first polarization beam splitting component incident from the first input port first polarization beam splitter to the fifteenth optical waveguide, so that both of the horizontal polarization component and the vertical polarization component of the second polarization beam splitting component incident from the first input port of the first polarization beam splitter are output from the second input port of the first polarization beam splitter for polarization combination to generate a first polarization synthesized optical signal; and transmit a horizontal polarization component of a second polarization beam splitting component incident from the second input port of the first polarization beam splitter to the fifteenth optical waveguide and reflect a vertical polarization component of the second polarization beam splitting component incident from the second input port of the first polarization beam splitter to the fifteenth optical waveguide, so that both of the horizontal polarization component and the vertical polarization component of the second polarization beam splitting component incident from the second input port of the first polarization beam splitter are output from the first input port of the first polarization beam splitter for polarization combination to generate a second polarization synthesized optical signal;

the second polarization beam splitter is configured to transmit a horizontal polarization component of a third polarization beam splitting component incident from the first input port of the second polarization beam splitter to the sixteenth optical waveguide and reflect a vertical polarization component of the third polarization beam splitting component incident from the first input port second polarization beam splitter to the sixteenth optical waveguide, so that both of the horizontal polarization component and the vertical polarization component of the third polarization beam splitting component incident from the first input port of the second polarization beam splitter are output from the second input port of the second polarization beam splitter for polarization combination to generate a third polarization synthesized optical signal; and transmit a horizontal polarization component of a fourth polarization beam splitting component incident from the second input port of the second polarization beam splitter to the sixteenth optical waveguide and reflect a vertical polarization component of the fourth polarization beam splitting component incident from the second input port of the second polarization beam splitter to the sixteenth optical waveguide, so that both of the horizontal polarization component and the vertical polarization component of the fourth polarization beam splitting component incident from the second input port of the second polarization beam splitter are output from the first input port of the second polarization beam splitter for polarization combination to generate a fourth polarization synthesized optical signal;

the third quarter-wave plate is configured to increase the vertical polarization component of the third polarization beam splitting component and the vertical polarization component of the fourth polarization beam splitting component passing through the third quarter-wave plate by π/2 phase;

the ninth polarization beam splitting rotator is further configured to preform polarization beam combining on a horizontal polarization component of the first polarization synthesized optical signal and a horizontal polarization component of the second polarization synthesized optical signal to generate the first interference optical signal; and perform polarization beam combining on a vertical polarization component of the first polarization synthesized optical signal and a vertical polarization component of the second polarization synthesized optical signal to generate the second interference optical signal; and the tenth polarization beam splitting rotator is configured to perform polarization beam combining on a horizontal polarization component of the third polarization synthesized optical signal and a horizontal polarization component of the fourth polarization synthesized optical signal to generate a third interference optical signal; and performing polarization beam combining on a vertical polarization component of the third polarization synthesized optical signal and a vertical polarization component of the fourth polarization synthesized optical signal to generate a fourth interference optical signal.

In some embodiments, the non-reciprocal polarization rotation module includes four identical polarization rotation optical waveguides, wherein each of the four polarization rotation optical waveguides includes a half-wave plate optical waveguide and a Faraday rotation optical waveguide that are closely connected; a polarization rotation angle of the Faraday rotation optical waveguide is 45°; and the first optical waveguide, the second optical waveguide, the third optical waveguide, and the fourth optical waveguide all contain a polarization rotation optical waveguide.

In some embodiments, the non-reciprocal polarization rotation module includes a second notch groove, a second half-wave plate and a first Faraday rotation plate, wherein the second notch groove is configured to transversely run through the first optical waveguide, the second optical waveguide, the third optical waveguide, and the fourth optical waveguide;

the second half-wave plate and the first Faraday rotation plate are aligned and tightly attached, and placed in the second notch groove; and an angle between a main axis of the second half-wave plate and the horizontal direction is 22.5°, and a polarization rotation angle of the Faraday rotation optical waveguide is 45°.

In some embodiments, the non-reciprocal polarization rotation module includes a second notch groove, a third half-wave plate, a fourth half-wave plate and the first Faraday rotation plate, wherein the second notch groove is configured to transversely run through the first optical waveguide, the second optical waveguide, the third optical waveguide, and the fourth optical waveguide;

the third half-wave plate is aligned with one end of the first Faraday rotation plate and closely attached to the first Faraday rotation plate at a first side of the first Faraday rotation plate, and the fourth half-wave plate is aligned with the other end of the first Faraday rotation plate and closely attached to the first Faraday rotation plate at the first side of the first Faraday rotation plate, and is placed in the second notch groove;

the first Faraday rotation plate is configured to transversely run through the first optical waveguide, the second optical waveguide, the third optical waveguide, and the fourth optical waveguide;

the third half-wave plate is configured to transversely run through the first optical waveguide and the second optical waveguide;

the fourth half-wave plate is configured to transversely run through the third optical waveguide and the fourth optical waveguide;

a first reflective film is coated on the first side of the first Faraday rotation plate attached to the third half-wave plate, at a gap between the third half-wave plate and the fourth half-wave plate;

an angle between a main axis of the third half-wave plate and the horizontal direction, and an angle between a main axis of the fourth half-wave plate and the horizontal direction are both 22.5°, and a polarization rotation angle of the first Faraday rotation optical waveguide is 45°;

the first round-trip delay interferometer includes the second beam splitter, a nineteenth optical waveguide, and a twentieth optical waveguide;

the second round-trip delay interferometer includes the third beam splitter, a twenty-first optical waveguide, a first phase shifter and a twenty-second optical waveguide, the nineteenth optical waveguide, the twentieth optical waveguide, the twenty-first optical waveguide and the twenty-second optical waveguide are all connected to a second side of the first Faraday rotation optical waveguide at a part corresponding to the first reflective film;

a length difference between the nineteenth optical waveguide and the twentieth optical waveguide is equal to half of an arm length difference of the first round-trip delay interferometer;

a length difference between the twenty-first optical waveguide and the twenty-second optical waveguide is equal to half of an arm length difference of the second round-trip delay interferometer;

the second beam splitter is configured to split the first signal light component to generate a first component and a second component with the same amplitude;

the third beam splitter is configured to split the second signal light component to generate a third component and a fourth component with the same amplitude;

the first reflective film and the first Faraday rotation optical waveguide are together configured to rotate polarization states of the first component, the second component, the third component and the fourth component respectively by 90° and reflect the first component, the second component, the third component and the fourth component;

the first phase shifter is configured to increase the third component by π/2 phase;

the second beam splitter is further configured to interfere reflected first component and reflected second component to generate a first interference optical signal and a second interference optical signal; and the third beam splitter is further configured to interfere reflected third component and reflected fourth component to generate a third interference optical signal and a fourth interference optical signal.

In some embodiments, the non-reciprocal polarization rotation module includes a second notch groove, a third half-wave plate, a fourth half-wave plate, a second Faraday rotation plate, a third Faraday rotation plate, a second reflective film and a fourth quarter-wave plate, the second notch groove is configured to transversely run through the first optical waveguide, the second optical waveguide, the third optical waveguide, and the fourth optical waveguide;

the third half-wave plate and the second Faraday rotation plate have a same length, are aligned and attached to each other, and are located at one end of the second notch groove; the fourth half-wave plate and the third Faraday rotation plate have a same length, are aligned and attached to each other, and are located at the other end of the second notch groove;

the third half-wave plate and the second Faraday rotation plate are configured to transversely run through the first optical waveguide and the second optical waveguide;

the fourth half-wave plate and the third Faraday rotation plate are configured to transversely run through the third optical waveguide and the fourth optical waveguide;

the second reflective film is coated on one side of the fourth quarter-wave plate where the third half-wave plate and the fourth half-wave plate are located, are located in a middle part of the second notch groove, and are aligned with the second Faraday rotation plate and the third Faraday rotation plate;

an angle between a main axis of the third half-wave plate and the horizontal direction, and an angle between a main axis of the fourth half-wave plate and the horizontal direction are both 22.5°; the second Faraday rotation plate and the third Faraday rotation plate both have a polarization rotation angle of 45°; an angle between a main axis of the fourth quarter-wave plate and the horizontal direction is 45°;

the first round-trip delay interferometer includes the second beam splitter, a nineteenth optical waveguide, and a twentieth optical waveguide;

the second round-trip delay interferometer includes the third beam splitter, a twenty-first optical waveguide, a first phase shifter and a twenty-second optical waveguide, the nineteenth optical waveguide, the twentieth optical waveguide, the twenty-first optical waveguide and the twenty-second optical waveguide are all connected to a second side of the first Faraday rotation optical waveguide at a part corresponding to the first reflective film;

a length difference between the nineteenth optical waveguide and the twentieth optical waveguide is equal to half of an arm length difference of the first round-trip delay interferometer; a length difference between the twenty-first optical waveguide and the twenty-second optical waveguide is equal to half of an arm length difference of the second round-trip delay interferometer;

the second beam splitter is configured to split the first signal light component to generate a first component and a second component with the same amplitude;

the third beam splitter is configured to split the second signal light component to generate a third component and a fourth component with the same amplitude;

the second reflective film and the fourth quarter-wave plate are together configured to correspondingly change horizontal polarization components and vertical polarization components of the polarization states of the first component, the second component, the third component and the fourth component, as the vertical polarization components and the horizontal polarization components, respectively, and reflects changed vertical polarization components and horizontal polarization components;

the first phase shifter is configured to increase the third component by π/2 phase;

the second beam splitter is further configured to interfere reflected first component and reflected second component to generate a first interference optical signal and a second interference optical signal; and the third beam splitter is further configured to interfere reflected third component and reflected fourth component to generate a third interference optical signal and a fourth interference optical signal.

In some embodiments, a second phase shifter and a third phase shifter are provided on the sixth optical waveguide and the eighth optical waveguide, respectively, and are configured to correspondingly adjust a phase difference of the long arm and the short arm of the first round-trip delay interferometer, and a phase difference of the long arm and the short arm of the second round-trip delay interferometer, respectively.

In some embodiments, a fourth phase shifter and a fifth phase shifter are provided on the tenth optical waveguide and the twelfth optical waveguide, respectively, and are configured to correspondingly adjust a phase difference of the long arm and the short arm of the first round-trip delay interferometer, and a phase difference of the long arm and the short arm of the second round-trip delay interferometer, respectively.

In some embodiments, a sixth phase shifter is provided on the fifteenth optical waveguide, and the third quarter wave plate can be replaced by a seventh phase shifter, and the sixth phase shifter and the seventh phase shifter are configured to correspondingly adjust a phase difference of the long arm and the short arm of the first round-trip delay interferometer, and a phase difference of the long arm and the short arm of the second round-trip delay interferometer, respectively.

Compared with the prior art, the present application achieves the following beneficial effect:

The present application provides an integrated self-coherent receiving optical chip based on round-trip delay interferometers, in which a multi-port circulator array is integrated with two round-trip delay interferometers, which can realize a self-coherent reception of polarization-independent signal light, without an active polarization control, eliminating the influence of random changes in the polarization state of the signal light on the receiver, and improving the stability of the receiving device. Moreover, the receiving device only needs two delay interferometers and two sets of balanced detectors, which reduces the difficulty and complexity of processing of electronic signal received and detected, so the complexity of the receiving end can be greatly reduced. At the same time, the technical solution of the present application can be applied not only to optical communication systems, but also to continuous variable quantum key distribution systems and sensor systems, and has high versatility and practicability.

DETAILED DESCRIPTION

The present application will be clearly and completely described below with reference to the Figures of the present application.

Figure 1:
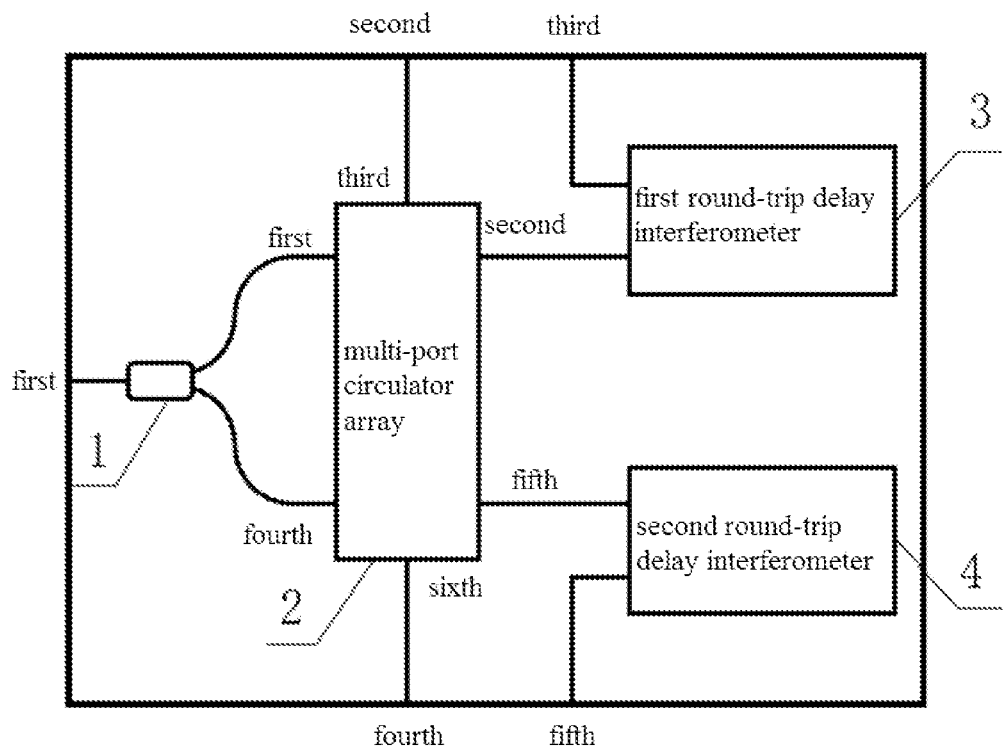
FIG. 1 is a structural principle diagram of an integrated self-coherent receiving optical chip based on round-trip delay interferometers according to the present application.

As shown in FIG. 1, the integrated self-coherent receiving optical chip based on round-trip delay interferometers includes a first beam splitter 1, a multi-port circulator array 2, a first round-trip delay interferometer 3 and a second round-trip delay interferometer 4, integrated on the same substrate;

the first beam splitter 1 is configured to split a signal light input to a first port of the optical chip to generate a first signal light component and a second signal light component;

the multi-port circulator array 2 is configured to transmit the first signal light component input to a first port of the multi-port circulator array to a second port of the multi-port circulator array to be output; and transmit the second signal light component input to a fourth port of the multi-port circulator array to a fifth port of the multi-port circulator array to be output;

the first round-trip delay interferometer 3 has a first long arm and a first short arm, the first long arm and the first short arm are configured to perform a round-trip transmission of the first signal light component input to a first port of the first round-trip delay interferometer, and complete a delayed self-interference before returning to the first port of the first round-trip delay interferometer, to generate a first interference optical signal and a second interference optical signal output from the first port of the first round-trip delay interferometer and a second port of the first round-trip delay interferometer, respectively; the second round-trip delay interferometer 4 has a second long arm and a second short arm, a phase difference between the second long arm and the second short arm is $\pi/2$, and the second long arm and the second short arm are configured to perform a round-trip transmission of the second signal light component input to a first port of the second round-trip delay interferometer, and complete a delayed self-interference before returning to the first port of the second round-trip delay interferometer, to generate a third interference optical signal and a fourth interference optical signal output from the first port of the second round-trip delay interferometer and a second port of the second round-trip delay interferometer, respectively;

the multi-port circulator array 2 is further configured to transmit the first interference optical signal input to the second port of the multi-port circulator array to a third port of the multi-port circulator array, and output the first interference optical signal input to the second port of the multi-port circulator array from a second port of the optical chip; and transmit the third interference optical signal input to the fifth port of the multi-port circulator array to a sixth port of the multi-port circulator array, and output the third interference optical signal input to the fifth port of the multi-port circulator array from a fourth port of the optical chip;

The specific working principle is as follows:

the signal light E(t) received by the receiving optical chip first enters the first beam splitter 1 and is split into the first signal light component $E_1(t)$ and the second signal light component $E_2(t)$, satisfying $E_1(t)=E_2(t)=1/\sqrt{2}E(t)$, wherein the first signal light component enters the first port of the multi-port circulator array 2, is output from the second port of the multi-port circulator array 2 and reaches a first port of the first round-trip delay interferometer 3, for round-trip transmission, and completes the delayed self-interference before returning to the first port of the first round-trip delay interferometer, to generate to the first interference optical signal $E_{out1}(t)$ and the second interference optical signal $E_{out2}(t)$, respectively expressed as:

$$E_{out1}(t) = \frac{1}{2\sqrt{2}}[E(t) + E(t - \tau)]$$

$$E_{out2}(t) = \frac{1}{2\sqrt{2}}[E(t) - E(t - \tau)],$$

wherein $\tau$ refers to a delay corresponding to an arm length difference between a long arm and a short arm of a first polarization-independent delay interferometer 4;

the first interference optical signal is output from the first port of the first round-trip delay interferometer 3 where the first signal light component enters, enters the second port of the multi-port circulator array 2, is output from the third port of the multi-port circulator array, and is finally output from the second port of the optical chip; the second interference optical signal is output from the second port of the first round-trip delay interferometer 3, and is finally output from a third port of the optical chip;

a differential current signal generated by a balanced detection of the first interference optical signal and the second interference optical signal respectively output from the second port of the optical chip and the third port of the optical chip is an in-phase component, expressed as:

$$I_I(t) = \frac{R}{2}|E(t)||E(t-\tau)|\cos(\omega\tau),$$

wherein R refers to a response efficiency of a photoelectric detector, $\omega$ refers to an angular frequency of a signal light;

the second signal light component enters the fourth port of the multi-port circulator array 2, is output from the second port of the multi-port circulator array 2 and reaches the first port of the second round-trip delay interferometer 4, for round-trip transmission, and completes the delay self-interference before returning to the first port of the second round-trip delay interferometer; since there is a phase difference π/2 between the second long arm and the second short arm of the second round-trip delay interferometer 4, the third interference optical signal $E_{out3}(t)$ and the fourth interference optical signal $E_{out4}(t)$ can be respectively expressed as:

$$E_{out3}(t) = \frac{1}{2\sqrt{2}}[E(t) + jE(t-\tau)]$$

$$E_{out4}(t) = \frac{1}{2\sqrt{2}}[E(t) - jE(t-\tau)],$$

wherein τ refers to a delay corresponding to an arm length difference between the long arm and the short arm of a second polarization-independent delay interferometer 5, the third interference optical signal is output from the first port of the second round-trip delay interferometer 4 where the second signal light component enters, enters the fifth port of the multi-port circulator array 2, and is output from the sixth port of the multi-port circulator array 2, and is finally output from the fourth port of the optical chip; the fourth interference optical signal is output from the second port of the second round-trip delay interferometer 4, and is finally output from a fifth port of the optical chip, a differential current signal generated by balanced detection of the third interference optical signal and the fourth interference optical signal respectively output from the fourth port of the optical chip and the fifth port of the optical chip is a quadrature phase component, expressed as:

$$I_Q(t) = \frac{R}{2}|E(t)||E(t-\tau)|\sin(\omega\tau),$$

finally, an electrical signal of the in-phase component and an electrical signal of the quadrature phase component are synthesized into a complex signal, expressed as:

$$u(t) = I_I(t) + jI_Q(t) = \frac{R}{2}E(t)E^*(t-\tau),$$

the complex signal is sampled and digital signal processed, then electric field information of the signal light is recovered and a service data is obtained.

Figure 2:
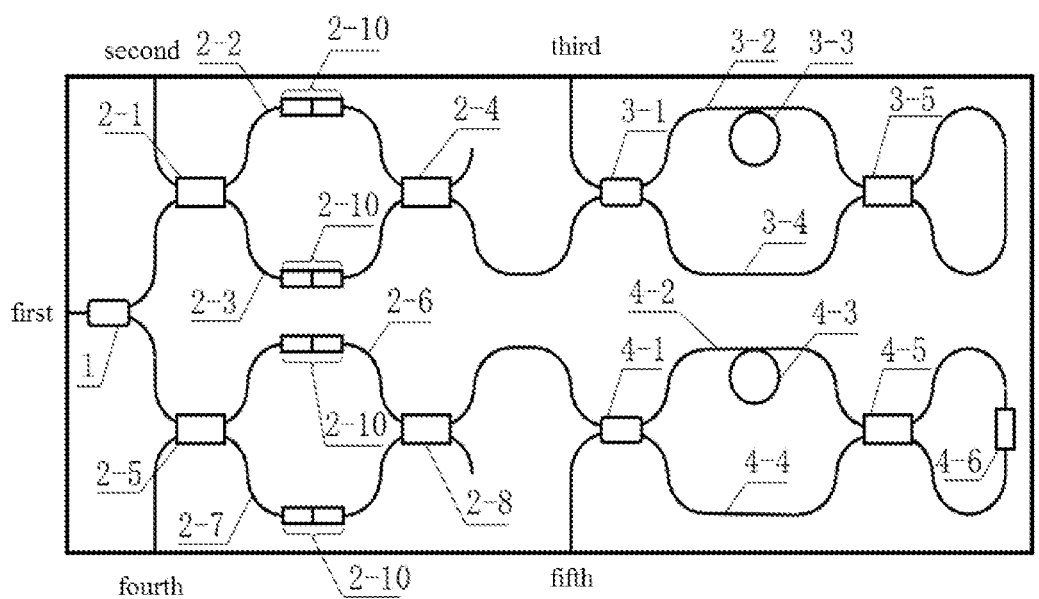
FIG. 2 is a principle diagram of Embodiment one of an integrated self-coherent receiving optical chip based on round-trip delay interferometers according to the present application.

As shown in FIG. 2, Embodiment one of the integrated self-coherent receiving optical chip based on round-trip delay interferometers of the present application is as follows:

the structure of the integrated self-coherent receiving optical chip based on round-trip delay interferometers is that, the multi-port circulator array 2 includes a first polarization beam splitting rotator 2-1, a first optical waveguide 2-2, a second optical waveguide 2-3, a second polarization beam splitting rotator 2-4, a third polarization beam splitting rotator 2-5, a third optical waveguide 2-6, a fourth optical waveguide 2-7, a fourth polarization beam splitting rotator 2-8 and the non-reciprocal polarization rotation module, the first optical waveguide 2-2, the second optical waveguide 2-3, the third optical waveguide 2-6, and the fourth optical waveguide 2-7 all contain a non-reciprocal polarization rotation module; the non-reciprocal polarization rotation module is configured to rotate a polarization state of the optical signal passing from one direction by 90°, and keep a polarization state of the optical signal passing from the other direction unchanged;

the first polarization beam splitting rotator 2-1 is configured to perform polarization beam splitting on the first signal light component input to one input port of the first polarization beam splitting rotator to generate a first polarization component of the first signal light and a second polarization component of the first signal light;

the second polarization beam splitting rotator 2-4 is configured to perform polarization beam combining on the first polarization component of the first signal light and the second polarization component of the first signal light passing through the non-reciprocal polarization rotation module in a forward direction, to recombine as the first signal light component; and configured to perform polarization beam splitting on the first interference optical signal to generate a first polarization component of the first interference optical signal and a second polarization component of the first interference optical signal;

the first polarization beam splitting rotator 2-1 is further configured to perform polarization beam combining on the first polarization component of the first interference optical signal and the second polarization component of the first interference optical signal passing through the non-reciprocal polarization rotation module in a reverse direction, to recombine as the first interference optical signal, and the recombined first interference optical signal is output from another input port of the first polarization beam splitting rotator;

the third polarization beam splitting rotator 2-5 is configured to perform polarization beam splitting on the second signal light component input to one input port of the third polarization beam splitting rotator to generate a first polarization component of the second signal light and a second polarization component of the second signal light;

the fourth polarization beam splitting rotator 2-8 is configured to perform polarization beam combining on the first polarization component of the second signal light and the second polarization component of the second signal light passing through the non-reciprocal polarization rotation module in a forward direction, to recombine as the second signal light component; and perform polarization beam splitting on the third interference optical signal to generate a first polarization component of the third interference optical signal and a second polarization component of the third interference optical signal;

the third polarization beam splitting rotator 2-5 is further configured to perform polarization beam combining on the first polarization component of the third interference optical signal and the second polarization component of the third interference optical signal passing through the non-reciprocal polarization rotation module in a reverse direction, to recombine as the third interference optical signal, and the recombined third interference optical signal is output from another input port of the third polarization beam splitting rotator;

the non-reciprocal polarization rotation module includes four identical polarization rotation optical waveguides 2-10, and each of the four polarization rotation optical waveguide 2-10 is composed of half-wave plate optical waveguide and Faraday rotation optical waveguide closely connected; an angle between a main axis of the half-wave plate optical waveguide and the horizontal direction is 22.5°, and a polarization rotation angle of the Faraday rotation optical waveguide is 45°;

each of the first optical waveguide 2-2, the second optical waveguide 2-3, the third optical waveguide 2-6, and the fourth optical waveguide 2-7 contains a polarization rotation optical waveguide 2-10.

The first round-trip delay interferometer 3 includes a second beam splitter 3-1, a fifth optical waveguide 3-2, a first delayed optical waveguide 3-3, a sixth optical waveguide 3-4 and a fifth polarization splitter beam rotator 3-5, the second beam splitter 3-1 is configured to split the first signal light component to generate a first component and a second component with the same amplitude;

the first delayed optical waveguide 3-3 is configured to delay the first component, with a length of half of an arm length difference of the first round-trip delay interferometer 3;

two output ports of the fifth polarization beam splitting rotator 3-5 are directly connected by an optical waveguide, and are configured to reflect the first component from an incident port, and change a horizontal polarization component and a vertical polarization component of the first component into a vertical polarization component and a horizontal polarization component of the first component, respectively; and configured to reflect the second component from an incident port, and change a horizontal polarization component and a vertical polarization component of the second component into a vertical polarization component and a horizontal polarization component;

the second beam splitter 3-1 is further configured to interfere the reflected first component and the second component to generate the first interference optical signal and the second interference optical signal, and the first interference optical signal and the second interference optical signal are correspondingly output from the input port where the first signal light component is input and the other input port;

the second round-trip delay interferometer 4 includes a third beam splitter 4-1, a seventh optical waveguide 4-2, a second delayed optical waveguide 4-3, an eighth optical waveguide 4-4, a sixth polarization splitter beam rotator 4-5 and a first quarter-wave plate 4-6, an angle between a main axis of the first quarter-wave plate 4-6 and the horizontal direction is 0°;

the third beam splitter 4-1 is configured to split the second signal light component to generate a third component and a fourth component with the same amplitude;

the second delayed optical waveguide 4-3 is configured to delay the third component, with a length of half of an arm length difference of the second round-trip delay interferometer 4;

two output ports of the sixth polarization beam splitting rotator 4-5 are directly connected by an optical waveguide, and are configured to reflect the third component from an incident port, and change a horizontal polarization component and a vertical polarization component of the third component into a vertical polarization component and a horizontal polarization component of the third component, respectively; and configured to reflect the fourth component from an incident port, and change a horizontal polarization component and a vertical polarization component of the fourth component into a vertical polarization component and a horizontal polarization component of the fourth component, respectively;

the optical waveguide directly connecting the two output ports of the sixth polarization beam splitting rotator 4-5 is also provided with a first quarter-wave plate 4-6 configured to increase the fourth component by $\pi/2$ phase, and not increase a phase of the third component; and the third beam splitter 4-1 is further configured to interfere the reflected third component and fourth component to generate a third interference optical signal and a fourth interference optical signal, and the third interference optical signal and the fourth interference optical signal are correspondingly output from the input port where the second signal light component is input and the other input port.

The specific working process of Embodiment one includes:

the signal light E(t) received by the receiving optical chip first enters the first beam splitter 1 and is split into the first signal light component $E_1(t)$ and the second signal light component $E_2(t)$, satisfying $E_1(t)=E_2(t)=1/\sqrt{2}E(t)$. Since the polarization becomes random when the signal light passes through the fiber channel and reaches the receiving device, which can be expressed as $$E(t) = A(t)e^{j(\omega t+\varphi_0)}\begin{bmatrix} \cos\theta \\ \sin\theta e^{j\delta} \end{bmatrix},$$

wherein $\theta$ refers to an angle between the horizontal polarization component and the vertical polarization component of the signal light, and $\delta$ refers to the phase difference between the horizontal polarization component and the vertical polarization component of the signal light.

The first signal light component enters the first polarization beam splitting rotator 2-1 and is polarization split to generate a first polarization component of the first signal light and a second polarization component of the first signal light, both of which are TE polarization, and pass through a polarization rotation optical waveguide 2-10 in forward direction, with the polarization state unchanged, and is polarization combined by the second polarization beam splitting rotator 2-4, recombined into the first signal light component. Then the recombined first signal light component reaches the second beam splitter 3-1, and the polarization state becomes $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix}.$$

Then it is split into the first component $E_{11}(t)$ and the second component $E_{12}(t)$ with the same polarization by the second beam splitter 3-1, and the first component $E_{11}(t)$ and the second component $E_{12}(t)$ enter the fifth optical waveguide 3-2 and the sixth optical waveguide 3-4, respectively. In particular, $E_{11}(t)$ passes through the first delayed optical waveguide 3-3, arrives one input port of the fifth polarization beam splitting rotator 3-5, the horizontal polarization component of $E_{11}(t)$ passes through the Sagnac ring constructed by directly connecting two output ports of the fifth polarization beam splitting rotator 3-5, is output still from this input port of the fifth polarization beam splitting rotator 3-5, and becomes a vertical polarization; the vertical polarization component of $E_{11}(t)$ passes through the same Sagnac ring, is output still from this input port of the fifth polarization beam splitting rotator 3-5, and becomes a horizontal polarization; and the two are recombined into the first component $E_{11}(t)$. After passing through the first delayed optical waveguide 3-3 and the fifth optical waveguide 3-2 again, and the polarization state becomes $$E_{11}(t) = \frac{A(t)e^{j(\omega t+\varphi_0)}}{2}\begin{bmatrix} \sin\theta_1 e^{j\delta_1} \\ \cos\theta_1 \end{bmatrix}.$$

$E_{12}(t)$ reaches the other input port of the fifth polarization beam splitting rotator 3-5, the horizontal polarization component of $E_{12}(t)$ passes through the Sagnac ring constructed by directly connecting two output ports of the fifth polarization beam splitting rotator 3-5, is output still from this input port of the fifth polarization beam splitting rotator 3-5, and becomes a vertical polarization; the vertical polarization component of $E_{12}(t)$ passes through the same Sagnac ring, is output still from this input port of the fifth polarization beam splitting rotator 3-5, and becomes a horizontal polarization; and the two are recombined into the second component $E_{12}(t)$. After passing through the fifth optical waveguide 3-2 again, and the polarization state becomes $$E_{12}(t-\tau) = \frac{A(t-\tau)e^{j(\omega(t-\tau)+\varphi_0)}}{2}\begin{bmatrix} \sin\theta_1 e^{j\delta_1} \\ \cos\theta_1 \end{bmatrix}$$

The two have a same polarization, and interfere at the second beam splitter 3-1, and the generated first interference optical signal $E_{out1}(t)$ and the second interference optical signal $E_{out2}(t)$ can be respectively expressed as $$E_{out1}(t) = \frac{e^{j(\omega t+\varphi_0)}}{2\sqrt{2}}[A(t) + A(t-\tau)e^{-j\omega\tau}]\begin{bmatrix} \sin\theta_1 e^{j\delta_1} \\ \cos\theta_1 \end{bmatrix},$$
$$E_{out2}(t) = \frac{e^{j(\omega t+\varphi_0)}}{2\sqrt{2}}[A(t) - A(t-\tau)e^{-j\omega\tau}]\begin{bmatrix} \sin\theta_1 e^{j\delta_1} \\ \cos\theta_1 \end{bmatrix}$$

wherein τ refers to the delay corresponding to an arm length difference between the first long arm and the first short arm of the first round-trip delay interferometer 3.

The first interference optical signal is output from a port of the second beam splitter 3-1 where the first signal light component enters, enters an output port of the second polarization beam splitting rotator 2-4, and is polarization split into two polarization components, both of which are TE polarization. And the polarization states of the two are rotated by 90° after passing through the polarization rotator optical waveguide 2-10 in a reverse direction, and becomes TM polarization. The two polarization components is combined by the first polarization beam splitting rotator 2-1, then are output from the other input port, and finally outputs from the second port of the optical chip; the second interference optical signal is output from the other port of the second beam splitter 3-1, and is finally output from a third port of the optical chip.

The differential current signal generated by balanced detection of the first interference optical signal and the second interference optical signal respectively output from the second port of the optical chip and the third port of the optical chip is the in-phase component, which can be expressed as $$I_I(t) = R[|E_{out1}(t)|^2 - |E_{out2}(t)|^2] =$$
$$\frac{R}{2}|E(t)||E(t-\tau)|\cos(\omega\tau) = \frac{R}{2}A(t)A(t-\tau)\cos(\omega\tau),$$

wherein R refers to the response efficiency of the photoelectric detector, and ω refers to the angular frequency of the signal light. It can be seen that the self-interference in-phase component of the first signal light component has nothing to do with polarization.

The second signal light component enters the third polarization beam splitting rotator 2-5 and is polarization split into two polarization components, both of which are TE polarization, pass through a polarization rotation optical waveguide 2-10 in forward direction, with the polarization state unchanged, and are polarization combined by the fourth polarization beam splitting rotator 2-8 and recombined into the second signal light component. Then the recombined second signal light component reach the third beam splitter 4-1, and the polarization state becomes $$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix}.$$

Then the second signal light component undergoes polarization-independent delayed self-interference similar to that of the first signal light component, to generate a third interference optical signal $E_{out3}(t)$ and a fourth interference optical signal $E_{out4}(t)$. Since the first quarter-wave plate 4-6 guarantees the phase difference between the long arm and the short arm is π/2, and the two can be expressed as $$E_{out1}(t) = \frac{e^{j(\omega t+\varphi_0)}}{2\sqrt{2}}[A(t) + jA(t-\tau)e^{-j\omega\tau}]\begin{bmatrix} \sin\theta_2 e^{j\delta_2} \\ \cos\theta_2 \end{bmatrix},$$
$$E_{out2}(t) = \frac{e^{j(\omega t+\varphi_0)}}{2\sqrt{2}}[A(t) - jA(t-\tau)e^{-j\omega\tau}]\begin{bmatrix} \sin\theta_2 e^{j\delta_2} \\ \cos\theta_2 \end{bmatrix}$$

wherein τ refers to the delay corresponding to an arm length difference between the second long arm and the second short arm of the second round-trip delay interferometer 4.

The third interference optical signal is output from the port of the third beam splitter 4-1 where the second signal light component enters, enters an output port of the fourth polarization beam splitting rotator 2-8, and is polarization split into two polarization components, both of which are TE polarization. And the polarization states of the two are rotated by 90° after passing through the polarization rotator optical waveguide 2-10 in a reverse direction, and becomes TM polarization. The two polarization components are combined by the third polarization beam splitting rotator 2-5, then are output from the other input port, and finally outputs from a fourth port of the optical chip; the fourth interference optical signal is output from the other port of the third beam splitter 4-1, and is finally output from a fifth port of the optical chip.

The differential current signal generated by balanced detection of the third interference optical signal and the fourth interference optical signal respectively output from the fourth port of the optical chip and the fifth port of the optical chip is a quadrature phase component, which can be expressed as $$I_Q(t) =$$
$$R\left[|E_{out3}(t)|^2 - |E_{out4}(t)|^2\right] = \frac{R}{2}|E(t)||E(t-\tau)|\sin(\omega\tau) = \frac{R}{2}A(t)A(t-\tau)\sin(\omega\tau),$$

It can be seen that the self-interference quadrature phase component of the second signal light component is independent of polarization.

Finally, the electrical signals of the in-phase component and the quadrature phase component are synthesized into a complex signal, which can be expressed as $$u(t) = I_I(t) + jI_Q(t) = \frac{R}{2}E(t)E^*(t-\tau).$$

The complex signal above is sampled and digital signal processed, then electric field information of the signal light is recovered and a service data is obtained.

Figure 3:
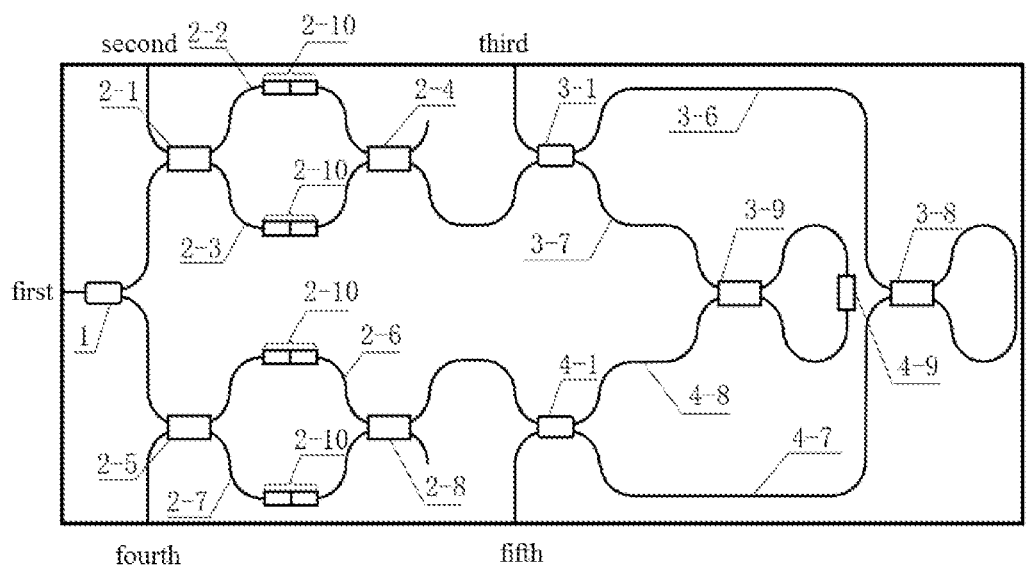
FIG. 3 is a principle block diagram of Embodiment two of an integrated self-coherent receiving optical chip based on round-trip delay interferometers according to the present application.

As shown in FIG. 3, Embodiment two of the integrated self-coherent receiving optical chip based on round-trip delay interferometers of the present application is as follows:

the structure of the integrated self-coherent receiving optical chip based on round-trip delay interferometers is that, the multi-port circulator array 2 includes a first polarization beam splitting rotator 2-1, a first optical waveguide 2-2, a second optical waveguide 2-3, a second polarization beam splitting rotator 2-4, a third polarization beam splitting rotator 2-5, a third optical waveguide 2-6, a fourth optical waveguide 2-7, a fourth polarization beam splitting rotator 2-8 and the non-reciprocal polarization rotation module, the first optical waveguide 2-2, the second optical waveguide 2-3, the third optical waveguide 2-6, and the fourth optical waveguide 2-7 all contain a non-reciprocal polarization rotation module; the non-reciprocal polarization rotation module is configured to rotate a polarization state of the optical signal passing from one direction by 90°, and keep a polarization state of the optical signal passing from the other direction unchanged;

the first polarization beam splitting rotator 2-1 is configured to perform polarization beam splitting on the first signal light component input to one input port of the first polarization beam splitting rotator to generate a first polarization component of the first signal light and a second polarization component of the first signal light;

the second polarization beam splitting rotator 2-4 is configured to perform polarization beam combining on the first polarization component of the first signal light and the second polarization component of the first signal light passing through the non-reciprocal polarization rotation module in a forward direction, to recombine as the first signal light component; and configured to perform polarization beam splitting on the first interference optical signal to generate a first polarization component of the first interference optical signal and a second polarization component of the first interference optical signal;

the first polarization beam splitting rotator 2-1 is further configured to perform polarization beam combining on the first polarization component of the first interference optical signal and the second polarization component of the first interference optical signal passing through the non-reciprocal polarization rotation module in a reverse direction, to recombine as the first interference optical signal, and the recombined first interference optical signal is output from another input port of the first polarization beam splitting rotator;

the third polarization beam splitting rotator 2-5 is configured to perform polarization beam splitting on the second signal light component input to one input port of the third polarization beam splitting rotator to generate a first polarization component of the second signal light and a second polarization component of the second signal light;

the fourth polarization beam splitting rotator 2-8 is configured to perform polarization beam combining on the first polarization component of the second signal light and the second polarization component of the second signal light passing through the non-reciprocal polarization rotation module in a forward direction, to recombine as the second signal light component; and perform polarization beam splitting on the third interference optical signal to generate a first polarization component of the third interference optical signal and a second polarization component of the third interference optical signal;

the third polarization beam splitting rotator 2-5 is further configured to perform polarization beam combining on the first polarization component of the third interference optical signal and the second polarization component of the third interference optical signal passing through the non-reciprocal polarization rotation module in a reverse direction, to recombine as the third interference optical signal, and the recombined third interference optical signal is output from another input port of the third polarization beam splitting rotator;

the non-reciprocal polarization rotation module includes four identical polarization rotation optical waveguides 2-10, and each of the four polarization rotation optical waveguide 2-10 is composed of half-wave plate optical waveguide and Faraday rotation optical waveguide closely connected; an angle between a main axis of the half-wave plate optical waveguide and the horizontal direction is 22.5°, and a polarization rotation angle of the Faraday rotation optical waveguide is 45°;

each of the first optical waveguide 2-2, the second optical waveguide 2-3, the third optical waveguide 2-6, and the fourth optical waveguide 2-7 contains a polarization rotation optical waveguide 2-10.

The first round-trip delay interferometer 3 includes a second beam splitter 3-1, a ninth optical waveguide 3-6, a tenth optical waveguide 3-7, a seventh polarization beam splitting rotator 3-8 and an eighth polarization beam splitter rotator 3-9.

A length difference between the ninth optical waveguide 3-6 and the tenth optical waveguide 3-7 is half of the arm length difference of the first round-trip delay interferometer 3;

the second beam splitter 3-1 is configured to split the first signal light component to generate a first component and a second component with the same amplitude;

two output ports of the seventh polarization beam splitting rotator 3-8 are directly connected by an optical waveguide, and are configured to reflect the first component from an incident port, and change a horizontal polarization component and a vertical polarization component of the first component into a vertical polarization component and a horizontal polarization component of the first component, respectively;

two output ports of the eighth polarization beam splitting rotator 3-9 are directly connected by an optical waveguide, and are configured to reflect the second component from an incident port, and change a horizontal polarization component and a vertical polarization component of the first component into a vertical polarization component and a horizontal polarization component of the first component, respectively;

the second beam splitter 3-1 is further configured to interfere the reflected first component and the second component to generate a first interference optical signal and a second interference optical signal;

The second round-trip delay interferometer 4 includes a third beam splitter 4-1, an eleventh optical waveguide 4-7, a twelfth optical waveguide 4-8, a second quarter-wave plate 4-9 and the seventh polarization beam splitting rotator 3-8 and the eighth polarization beam splitting rotator 3-9 shared with the first round-trip delay interferometer 3;

an angle between a main axis of the second quarter-wave plate 4-9 and the horizontal direction is 0°;

the length difference between the eleventh optical waveguide 4-7 and the twelfth optical waveguide 4-8 is half of the arm length difference of the second round-trip delay interferometer 4;

the third beam splitter 4-1 is configured to split the second signal light component to generate two a third component and a fourth component with the same amplitude;

the seventh polarization beam splitting rotator 3-8 is further configured to reflect the third component from the other input port thereof, and change a horizontal polarization component and a vertical polarization component into a vertical polarization component and a horizontal polarization, respectively;

the eighth polarization beam splitting rotator 3-9 is further configured to reflect the fourth component from the other input port thereof, and change a horizontal polarization component and a vertical polarization component into a vertical polarization component and a horizontal polarization, respectively;

the optical waveguide directly connecting the two output ports of the eighth polarization beam splitting rotator 3-9 is also provided with a second quarter-wave plate 4-9 configured to increase the fourth component by π/2 phase, and not increase a phase of the third component; and the third beam splitter 4-1 is further configured to interfere the reflected third component and fourth component to generate a third interference optical signal and a fourth interference optical signal.

The specific working process of Embodiment two includes:

the signal light E(t) received by the receiving optical chip first enters the first beam splitter 1 and is split into the first signal light component $E_1(t)$ and the second signal light component $E_2(t)$, satisfying $E_1(t)=E_2(t)=1/\sqrt{2}E(t)$. Since the polarization becomes random when the signal light passes through the fiber channel and reaches the receiving device, which can be expressed as $$E(t) = A(t)e^{j(\omega t+\varphi_0)}\begin{bmatrix} \cos\theta \\ \sin\theta e^{j\delta} \end{bmatrix},$$

wherein θ refers to an angle between the horizontal polarization component and the vertical polarization component of the signal light, and δ refers to the phase difference between the horizontal polarization component and the vertical polarization component of the signal light.

The first signal light component enters the first polarization beam splitting rotator 2-1 and is polarization split to generate a first polarization component of the first signal light and a second polarization component of the first signal light, both of which are TE polarization, and pass through a polarization rotation optical waveguide 2-10 in forward direction, with the polarization state unchanged, and is polarization combined by the second polarization beam splitting rotator 2-4, recombined into the first signal light component. Then the recombined first signal light component reaches the second beam splitter 3-1, the polarization state becomes $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix}.$$

Then it is split into the first component $E_{11}(t)$ and the second component $E_{12}(t)$ with the same polarization by the second beam splitter 3-1, and the first component $E_{11}(t)$ and the second component $E_{12}(t)$ enter the ninth optical waveguide 3-6 and the tenth optical waveguide 3-7, respectively. In particular, $E_{11}(t)$ reaches an input port of the seventh polarization beam splitting rotator 3-8, the horizontal polarization component of $E_{11}(t)$ passes through the Sagnac ring constructed by directly connecting two output ports of the seventh polarization beam splitting rotator 3-8, is output still from this input port of the seventh polarization beam splitting rotator 3-8, and becomes a vertical polarization; the vertical polarization component of $E_{11}(t)$ passes through the same Sagnac ring, is output still from this input port of the seventh polarization beam splitting rotator 3-8, and becomes a horizontal polarization; and the two are recombined into the first component $E_{12}(t)$. After passing through the ninth optical waveguide 3-6 again, the polarization state becomes $$E_{11}(t) = \frac{A(t)e^{j(\omega t+\varphi_0)}}{2}\begin{bmatrix} \sin\theta_1 e^{j\delta_1} \\ \cos\theta_1 \end{bmatrix}.$$

$E_{12}(t)$ reaches an input port of the eighth polarization beam splitting rotator 3-9 through the tenth optical waveguide 3-7, the horizontal polarization component of $E_{12}(t)$ passes through the Sagnac ring constructed by directly connecting two output ports of the eighth polarization beam splitting rotator 3-9, is output still from this input port of the eighth polarization beam splitting rotator 3-9, and becomes a vertical polarization; the vertical polarization component of $E_{12}(t)$ passes through the same Sagnac ring, is output still from this input port of the eighth polarization beam splitting rotator 3-9, and becomes a horizontal polarization; and the two are recombined into the second component $E_{12}(t)$. After passing through the tenth optical waveguide 3-7 again, the polarization state becomes $$E_{12}(t-\tau) = \frac{A(t-\tau)e^{j(\omega(t-\tau)+\varphi_0)}}{2}\begin{bmatrix} \sin\theta_1 e^{j\delta_1} \\ \cos\theta_1 \end{bmatrix}.$$

The two have a same polarization, and interfere at the second beam splitter 3-1, and the generated first interference optical signal $E_{out1}(t)$ and the second interference optical signal $E_{out2}(t)$ can be respectively expressed as $$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}$$

$$E_{out2}(t) = \frac{e^{j(\omega t+\varphi_0)}}{2\sqrt{2}}[A(t)-A(t-\tau)e^{-j\omega\tau}]\begin{bmatrix} \sin\theta_1 e^{j\delta_1} \\ \cos\theta_1 \end{bmatrix},$$

wherein τ refers to the delay corresponding to an arm length difference between the first long arm and the first short arm of the first round-trip delay interferometer 3.

The first interference optical signal is output from a port of the second beam splitter 3-1 where the first signal light component enters, enters an output port of the second polarization beam splitting rotator 2-4, and is polarization split into two polarization components, both of which are TE polarization. And the polarization states of the two are rotated by 90° after passing through the polarization rotator optical waveguide 2-10 in a reverse direction, and becomes TM polarization. The two polarization components is combined by the first polarization beam splitting rotator 2-1, then are output from the other input port, and finally outputs from the second port of the optical chip; the second interference optical signal is output from the other port of the second beam splitter 3-1, and is finally output from a third port of the optical chip.

The differential current signal generated by balanced detection of the first interference optical signal and the second interference optical signal respectively output from the second port of the optical chip and the third port of the optical chip is the in-phase component, which can be expressed as $$I_I(t) = R[|E_{out1}(t)|^2 - |E_{out2}(t)|^2] =$$

$$\frac{R}{2}|E(t)||E(t-\tau)|\cos(\omega\tau) = \frac{R}{2}A(t)A(t-\tau)\cos(\omega\tau),$$

wherein R refers to the response efficiency of the photoelectric detector, and ω refers to the angular frequency of the signal light. It can be seen that the self-interference in-phase component of the first signal light component has nothing to do with polarization.

The second signal light component enters the third polarization beam splitting rotator 2-5 and is polarization split into two polarization components, both of which are TE polarization, pass through a polarization rotation optical waveguide 2-10 in forward direction, with the polarization state unchanged, and are polarization combined by the fourth polarization beam splitting rotator 2-8 and recombined into the second signal light component. Then the state becomes $$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix}.$$

Then the second signal light component undergoes polarization-independent delayed self-interference similar to that of the first signal light component, to generate a third interference optical signal $E_{out3}(t)$ and a fourth interference optical signal $E_{out4}(t)$. Since the second quarter-wave plate 4-9 guarantees the phase difference between the long arm and the short arm is π/2, and the two can be expressed as $$E_{out1}(t) = \frac{e^{j(\omega t+\varphi_0)}}{2\sqrt{2}}[A(t)+jA(t-\tau)e^{-j\omega\tau}]\begin{bmatrix} \sin\theta_2 e^{j\delta_2} \\ \cos\theta_2 \end{bmatrix}$$

$$E_{out2}(t) = \frac{e^{j(\omega t+\varphi_0)}}{2\sqrt{2}}[A(t)-jA(t-\tau)e^{-j\omega\tau}]\begin{bmatrix} \sin\theta_2 e^{j\delta_2} \\ \cos\theta_2 \end{bmatrix},$$

wherein τ refers to the delay corresponding to an arm length difference between the second long arm and the second short arm of the second round-trip delay interferometer 4.

The third interference optical signal is output from the port of the third beam splitter 4-1 where the second signal light component enters, enters an output port of the fourth polarization beam splitting rotator 2-8, and is polarization split into two polarization components, both of which are TE polarization. And the polarization states of the two are rotated by 90° after passing through the polarization rotator optical waveguide 2-10 in a reverse direction, and becomes TM polarization. The two polarization components is combined by the third polarization beam splitting rotator 2-5, then are output from the other input port, and finally outputs from a fourth port of the optical chip; the fourth interference optical signal is output from the other port of the third beam splitter 4-1, and is finally output from a fifth port of the optical chip.

The differential current signal generated by balanced detection of the third interference optical signal and the fourth interference optical signal respectively output from the fourth port of the optical chip and the fifth port of the optical chip is a quadrature phase component, which can be expressed as $$I_Q(t) =$$

$$R[|E_{out3}(t)|^2 - |E_{out4}(t)|^2] = \frac{R}{2}|E(t)||E(t-\tau)|\sin(\omega\tau) = \frac{R}{2}A(t)A(t-\tau)\sin(\omega\tau).$$

It can be seen that the self-interference quadrature phase component of the second signal light component is independent of polarization.

Finally, the electrical signals of the in-phase component and the quadrature phase component are synthesized into a complex signal, which can be expressed as $$u(t) = I_I(t) + jI_Q(t) = \frac{R}{2}E(t)E^*(t-\tau).$$

The complex signal above is sampled and digital signal processed, then electric field information of the signal light is recovered and a service data is obtained.

Figure 4:
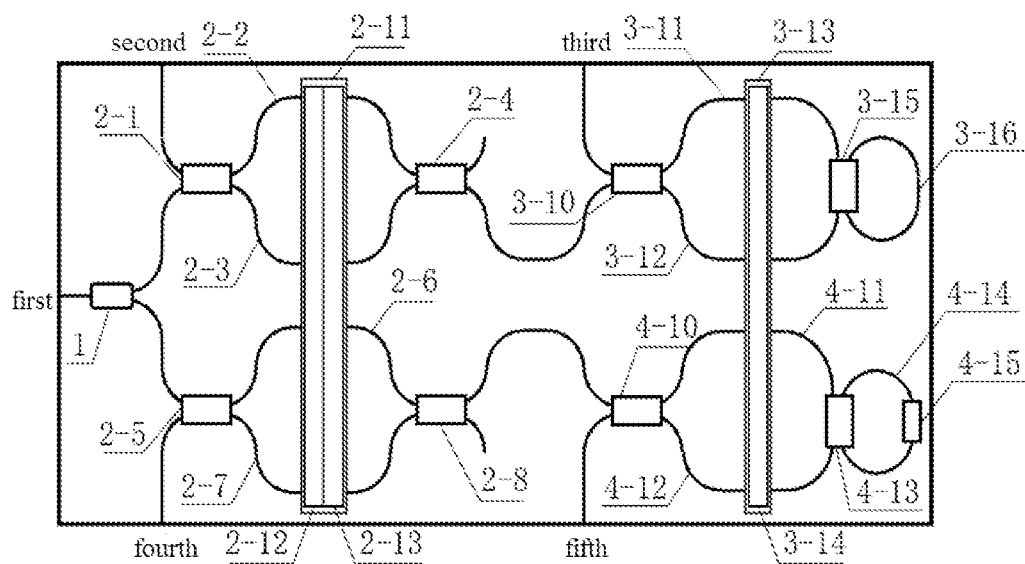
FIG. 4 is a principle block diagram of Embodiment three of an integrated self-coherent receiving optical chip based on round-trip delay interferometers according to the present application.

As shown in FIG. 4, Embodiment three of the integrated self-coherent receiving optical chip based on round-trip delay interferometers of the present application is as follows:

the structure of the integrated self-coherent receiving optical chip based on round-trip delay interferometers is that, the multi-port circulator array 2 includes a first polarization beam splitting rotator 2-1, a first optical waveguide 2-2, a second optical waveguide 2-3, a second polarization beam splitting rotator 2-4, a third polarization beam splitting rotator 2-5, a third optical waveguide 2-6, a fourth optical waveguide 2-7, a fourth polarization beam splitting rotator 2-8 and the non-reciprocal polarization rotation module, the first optical waveguide 2-2, the second optical waveguide 2-3, the third optical waveguide 2-6, and the fourth optical waveguide 2-7 all contain a non-reciprocal polarization rotation module; the non-reciprocal polarization rotation module is configured to rotate a polarization state of the optical signal passing from one direction by 90°, and keep a polarization state of the optical signal passing from the other direction unchanged;

the first polarization beam splitting rotator 2-1 is configured to perform polarization beam splitting on the first signal light component input to one input port of the first polarization beam splitting rotator to generate a first polarization component of the first signal light and a second polarization component of the first signal light;

the second polarization beam splitting rotator 2-4 is configured to perform polarization beam combining on the first polarization component of the first signal light and the second polarization component of the first signal light passing through the non-reciprocal polarization rotation module in a forward direction, to recombine as the first signal light component; and configured to perform polarization beam splitting on the first interference optical signal to generate a first polarization component of the first interference optical signal and a second polarization component of the first interference optical signal;

the first polarization beam splitting rotator 2-1 is further configured to perform polarization beam combining on the first polarization component of the first interference optical signal and the second polarization component of the first interference optical signal passing through the non-reciprocal polarization rotation module in a reverse direction, to recombine as the first interference optical signal, and the recombined first interference optical signal is output from another input port of the first polarization beam splitting rotator;

the third polarization beam splitting rotator 2-5 is configured to perform polarization beam splitting on the second signal light component input to one input port of the third polarization beam splitting rotator to generate a first polarization component of the second signal light and a second polarization component of the second signal light;

the fourth polarization beam splitting rotator 2-8 is configured to perform polarization beam combining on the first polarization component of the second signal light and the second polarization component of the second signal light passing through the non-reciprocal polarization rotation module in a forward direction, to recombine as the second signal light component; and perform polarization beam splitting on the third interference optical signal to generate a first polarization component of the third interference optical signal and a second polarization component of the third interference optical signal;

the third polarization beam splitting rotator 2-5 is further configured to perform polarization beam combining on the first polarization component of the third interference optical signal and the second polarization component of the third interference optical signal passing through the non-reciprocal polarization rotation module in a reverse direction, to recombine as the third interference optical signal, and the recombined third interference optical signal is output from another input port of the third polarization beam splitting rotator;

The non-reciprocal polarization rotation module includes a second notch groove 2-11, a second half-wave plate 2-12 and a first Faraday rotation plate 2-13.

The second notch groove 2-11 is configured to transversely run through the first optical waveguide 2-2, the second optical waveguide 2-3, the third optical waveguide 2-6, and the fourth optical waveguide 2-7;

the second half-wave plate 2-12 and the first Faraday rotation plate 2-13 are aligned and closely attached, and placed in the notch groove 2-11;

an angle between a main axis of the second half-wave plate 2-12 and the horizontal direction is 22.5°, and a polarization rotation angle of the Faraday rotation optical waveguide 2-13 is 45°;

the first round-trip delay interferometer 3 includes a ninth polarization beam splitter rotator 3-10, a thirteenth optical waveguide 3-11, a fourteenth optical waveguide 3-12, a first polarization beam splitter 3-15 and a fifteenth optical waveguide 3-16;

a length of the fifteenth optical waveguide 3-16 is equal to the arm length difference of the first round-trip delay interferometer 3;

the second round-trip delay interferometer 4 includes a tenth polarization beam splitter rotator 4-10, a sixteenth optical waveguide 4-11, a seventeenth optical waveguide 4-12, a second polarization beam splitter 4-13, an eighteenth optical waveguide 4-14 and a third quarter-wave plate 4-15, a length of the eighteenth optical waveguide 4-14 is the arm length difference of the second round-trip delay interferometer 4;

an angle between a main axis of the third quarter-wave plate 4-15 and the horizontal direction is 0°;

a first notch groove 3-13 is formed transversely through the thirteenth optical waveguide 3-11, the fourteenth optical waveguide 3-12, the sixteenth optical waveguide 4-11, and the seventeenth optical waveguide 4-12, and is inserted with a first half-wave plate 3-14, and an angle between a main axis of the first half-wave plate 3-14 and the horizontal direction is 22.5°;

the ninth polarization beam splitting rotator 3-10 is configured to perform polarization beam splitting on the first signal light component to generate a first polarization beam splitting component and a second polarization beam splitting component;

the tenth polarization beam splitting rotator 4-10 is configured to perform polarization beam splitting on the second signal light component to generate a third polarization beam splitting component and a fourth polarization beam splitting component;

the first half-wave plate 3-14 is configured to rotate a polarization state of a passing optical signal by 45°;

the first polarization beam splitter 3-15 is configured to transmit a horizontal polarization component of a first polarization beam splitting component incident from the first input port of the first polarization beam splitter and reflect a vertical polarization component of the first polarization beam splitting component incident from the first input port first polarization beam splitter to the fifteenth optical waveguide 3-16, so that both of the horizontal polarization component and the vertical polarization component of the second polarization beam splitting component incident from the first input port of the first polarization beam splitter are output from the second input port of the first polarization beam splitter for polarization combination to generate a first polarization synthesized optical signal; and transmit a horizontal polarization component of a second polarization beam splitting component incident from the second input port of the first polarization beam splitter and reflect a vertical polarization component of the second polarization beam splitting component incident from the second input port of the first polarization beam splitter to the fifteenth optical waveguide 3-16, so that both of the horizontal polarization component and the vertical polarization component of the second polarization beam splitting component incident from the second input port of the first polarization beam splitter are output from the first input port of the first polarization beam splitter for polarization combination to generate a second polarization synthesized optical signal;

the second polarization beam splitter 4-13 is configured to transmit a horizontal polarization component of a third polarization beam splitting component incident from the first input port of the second polarization beam splitter and reflect a vertical polarization component of the third polarization beam splitting component incident from the first input port second polarization beam splitter to the sixteenth optical waveguide 4-14, so that both of the horizontal polarization component and the vertical polarization component of the third polarization beam splitting component incident from the first input port of the second polarization beam splitter are output from the second input port of the second polarization beam splitter for polarization combination to generate a third polarization synthesized optical signal; and transmit a horizontal polarization component of a fourth polarization beam splitting component incident from the second input port of the second polarization beam splitter and reflect a vertical polarization component of the fourth polarization beam splitting component incident from the second input port of the second polarization beam splitter to the sixteenth optical waveguide 4-14, so that both of the horizontal polarization component and the vertical polarization component of the fourth polarization beam splitting component incident from the second input port of the second polarization beam splitter are output from the first input port of the second polarization beam splitter for polarization combination to generate a fourth polarization synthesized optical signal;

The third quarter-wave plate 4-15 is configured to increase the vertical polarization component of the third polarization beam splitting component and the vertical polarization component of the fourth polarization beam splitting component passing through the third quarter-wave plate by $\pi/2$ phase; the ninth polarization beam splitting rotator 3-10 is further configured to preform polarization beam combining on a horizontal polarization component of the first polarization synthesized optical signal and a horizontal polarization component of the second polarization synthesized optical signal to generate the first interference optical signal; and perform polarization beam combining on a vertical polarization component of the first polarization synthesized optical signal and a vertical polarization component of the second polarization synthesized optical signal to generate a second interference optical signal; and the tenth polarization beam splitting rotator 4-10 is configured to perform polarization beam combining on a horizontal polarization component of the third polarization synthesized optical signal and a horizontal polarization component of the fourth polarization synthesized optical signal to generate a third interference optical signal; and performing polarization beam combining on a vertical polarization component of the third polarization synthesized optical signal and a vertical polarization component of the fourth polarization synthesized optical signal to generate a fourth interference optical signal.

The specific working process of Embodiment three includes:

the signal light E(t) received by the receiving optical chip first enters the first beam splitter 1 and is split into the first signal light component $E_1(t)$ and the second signal light component $E_2(t)$, satisfying $E_1(t)=E_2(t)=1/\sqrt{2}E(t)$. Since the polarization becomes random when the signal light passes through the fiber channel and reaches the receiving device, which can be expressed as $$E(t) = A(t)e^{j(\omega t+\varphi_0)}\begin{bmatrix} \cos\theta \\ \sin\theta e^{j\delta} \end{bmatrix},$$

wherein $\theta$ refers to an angle between the horizontal polarization component and the vertical polarization component of the signal light, and $\delta$ refers to the phase difference between the horizontal polarization component and the vertical polarization component of the signal light.

The first signal light component enters the first polarization beam splitting rotator 2-1 and is polarization split to generate the first polarization component of the first signal light and the second polarization component of the first signal light, both of which are TE polarization, and pass through the second half-wave plate 2-12 and the first Faraday rotation plate 2-13, successively, with the polarization state unchanged, and is polarization combined by the second polarization beam splitting rotator 2-4, recombined into the first signal light component. Then the recombined first signal light component reaches the ninth polarization beam splitting rotator 3-10, and the polarization state becomes $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix}.$$

$E_1(t)$ is polarization split by the ninth polarization beam splitting rotator 3-10 to generate a first polarization beam splitting component $E_{11}(t)$ and a second polarization beam splitting component $E_{12}(t)$, both of which are TE polarization, enter the thirteenth optical waveguide 3-11 and the fourteenth light waves guide 3-14, respectively, and then simultaneously pass through the first half-wave plate 3-14 to rotate the polarization by 45°. In particular, before arriving at an input port of the first polarizing beam splitter 3-15, the polarization state is $$E_{11}(t) = \frac{A(t)e^{j(\omega t+\varphi_0)}}{2}\begin{bmatrix}\cos\theta_1\\\cos\theta_1\end{bmatrix}.$$

Then $E_{11}(t)$ is polarization split by the first polarization beam splitter 3-15, the horizontal polarization component is directly transmitted, and the vertical polarization component enters into the other input port of the first polarization beam splitter 3-15 along the fifteenth optical waveguide 3-16 after being output from one output port of the first polarization beam splitter 3-15, and is output from the other output port of the first polarization beam splitter 3-15 with the horizontal polarization component, and undergo polarization interference to generate the first polarization interference optical signal, the polarization state is $$E_{11out}(t) = \frac{e^{j(\omega t+\varphi_0)}\cos\theta_1}{2}\begin{bmatrix}A(t)\\A(t-\tau)e^{-j\omega\tau}\end{bmatrix}.$$

Then after the polarization rotation of the first half-wave plate 3-14 by 45°, it becomes $$E_{11out}(t) = \frac{e^{j(\omega t+\varphi_0)}\cos\theta_1}{2\sqrt{2}}\begin{bmatrix}A(t)+A(t-\tau)e^{-j\omega\tau}\\A(t)-A(t-\tau)e^{-j\omega\tau}\end{bmatrix}.$$

Before entering the other output port of the first polarization beam splitter 3-15, the polarization state is $$E_{12}(t) = \frac{A(t)e^{j(\omega t+\varphi_0)}}{2}\begin{bmatrix}\sin\theta_1 e^{j\delta_1}\\\sin\theta_1 e^{j\delta_1}\end{bmatrix}.$$

Then, $E_{12}(t)$ is polarization split by the first polarization beam splitter 3-15, the horizontal polarization component is directly transmitted, and the vertical polarization component enters into one output port of the first polarization beam splitter 3-15 along the fifteenth optical waveguide 3-16 after being output from the other input port of the first polarization beam splitter 3-15, and is output from the other input port of the first polarization beam splitter 3-15 with the horizontal polarization component, and undergo polarization interference to generate the second polarization interference optical signal, the polarization state is $$E_{12out}(t) = \frac{e^{j(\omega t+\varphi_0)}\sin\theta_1 e^{j\delta_1}}{2}\begin{bmatrix}A(t)\\A(t-\tau)e^{-j\omega\tau}\end{bmatrix}.$$

Then after the polarization rotation of the first half-wave plate 3-14 by 45°, it becomes $$E_{12out}(t) = \frac{e^{j(\omega t+\varphi_0)}\sin\theta_1 e^{j\delta_1}}{2\sqrt{2}}\begin{bmatrix}A(t)+A(t-\tau)e^{-j\omega\tau}\\A(t)-A(t-\tau)e^{-j\omega\tau}\end{bmatrix}.$$

The horizontal polarization component of the first polarization interference optical signal $E_{11out}(t)$ and the horizontal polarization component of the second polarization interference optical signal $E_{12out}(t)$ are simultaneously output from the input port of the ninth polarization beam splitting rotator 3-10 where the first signal light component enters, and combined as the first interference optical signal;

$$E_{out1}(t) = \frac{e^{j(\omega t+\varphi_0)}}{2\sqrt{2}}[A(t)+A(t-\tau)e^{-j\omega\tau}]\begin{bmatrix}\sin\theta_1 e^{j\delta_1}\\\cos\theta_1\end{bmatrix}$$

The vertical polarization component of the first polarization interference optical signal $E_{11out}(t)$ and the vertical polarization component of the second polarization interference optical signal $E_{12out}(t)$ are simultaneously output from the other input port of the ninth polarization beam splitting rotator 3-10, and are combined as the second interference light-related signal;

$$E_{out2}(t) = \frac{e^{j(\omega t+\varphi_0)}}{2\sqrt{2}}[A(t)-A(t-\tau)e^{-j\omega\tau}]\begin{bmatrix}\sin\theta_1 e^{j\delta_1}\\\cos\theta_1\end{bmatrix}$$

The first interference optical signal enters an output port of the second polarization beam splitting rotator 2-4, is polarization split into two polarization components, both of which are TE polarization, and each of the two passes through the first Faraday rotation plate 2-13 and the second half-wave plates 2-12 successively, then the polarization state is rotated by 90°, to become TM polarization. And after being polarization combined by the first polarization beam splitting rotator 2-1, combined first interference optical signal is output from the other input port, and is finally output from the second port of the optical chip. The second interference optical signal is directly output from the third port of the optical chip.

The differential current signal generated by balanced detection of the first interference optical signal and the second interference optical signal respectively output from the second port of the optical chip and the third port of the optical chip is the in-phase component, which can be expressed as $$I_I(t) = R[|E_{out1}(t)|^2 - |E_{out2}(t)|^2] = \frac{R}{2}|E(t)||E(t-\tau)|\cos(\omega\tau)$$
$$\frac{R}{2}A(t)A(t-\tau)\cos(\omega\tau)$$

wherein R refers to the response efficiency of the photoelectric detector, and ω refers to the angular frequency of the signal light. It can be seen that the self-interference in-phase component of the first signal light component has nothing to do with polarization.

The second signal light component enters the third polarization beam splitting rotator 2-5 and is polarization split into two polarization components, both of which are TE polarization, pass through the second half-wave plate 2-12 and the first Faraday rotation optical waveguide 2-13 successively, with the polarization state unchanged, and are polarization combined by the fourth polarization beam splitting rotator 2-8 and recombined into the second signal light component. Then the recombined second signal light component reach the ten polarization beam splitting rotator 4-10, and the polarization state becomes $$E_2(t) = \frac{A(t)e^{j(\omega t+\varphi_0)}}{\sqrt{2}}\begin{bmatrix}\cos\theta_2\\\sin\theta_2 e^{j\delta_2}\end{bmatrix}.$$

Then the second signal light component undergoes polarization-independent delayed self-interference similar to that of the first signal light component, to generate a third interference optical signal $E_{out3}(t)$ and a fourth interference optical signal $E_{out4}(t)$. Since the third quarter-wave plate 4-15 guarantees the phase difference between the long arm and the short arm is π/2, and the two can be expressed as $$E_{out3}(t) = \frac{e^{j(\omega t+\varphi_0)}}{2\sqrt{2}}[A(t) + jA(t-\tau)e^{-j\omega\tau}]\begin{bmatrix} \sin\theta_2 e^{j\delta_2} \\ \cos\theta_2 \end{bmatrix}$$

$$E_{out4}(t) = \frac{e^{j(\omega t+\varphi_0)}}{2\sqrt{2}}[A(t) - jA(t-\tau)e^{-j\omega\tau}]\begin{bmatrix} \sin\theta_2 e^{j\delta_2} \\ \cos\theta_2 \end{bmatrix}$$

wherein τ refers to the delay corresponding to an arm length difference between the second long arm and the second short arm of the second round-trip delay interferometer 4.

The third interference optical signal is output from the port of the tenth polarization beam splitting rotator 4-10 where the second signal light component enters, enters an output port of the fourth polarization beam splitting rotator 2-8, and is polarization split into two polarization components, both of which are TE polarization. And each of the two passes through the first Faraday rotation plate 2-13 and the second half-wave plate 2-12 successively, and the polarization state is rotated by 90°, to become TM polarization. The two are polarization combined by the third polarization beam splitting rotator 2-5, and the combined third interference optical signal is output from the other input port, and is finally output from the fourth port of the optical chip. The fourth interference optical signal is output from the other port of the tenth polarization beam splitting rotator 4-10, and is finally output from the fifth port of the optical chip.

The differential current signal generated by balanced detection of the third interference optical signal and the fourth interference optical signal respectively output from the fourth port of the optical chip and the fifth port of the optical chip is a quadrature phase component, which can be expressed as $$I_Q(t) = R[|E_{out3}(t)|^2 - |E_{out4}(t)|^2] = \frac{R}{2}|E(t)||E(t-\tau)|\sin(\omega\tau)$$
$$= \frac{R}{2}A(t)A(t-\tau)\sin(\omega\tau)$$

The differential current signal generated by balanced detection of the third interference optical signal and the fourth interference optical signal respectively output from the fourth port of the optical chip and the fifth port of the optical chip is a quadrature phase component, which can be expressed as It can be seen that the self-interference quadrature phase component of the second signal light component is independent of polarization.

Finally, the electrical signals of the in-phase component and the quadrature phase component are synthesized into a complex signal, which can be expressed as $$u(t) = I_I(t) + jI_Q(t) = \frac{R}{2}E(t)E^*(t-\tau).$$

The complex signal above is sampled and digital signal processed, then electric field information of the signal light is recovered and a service data is obtained.

Figure 5:
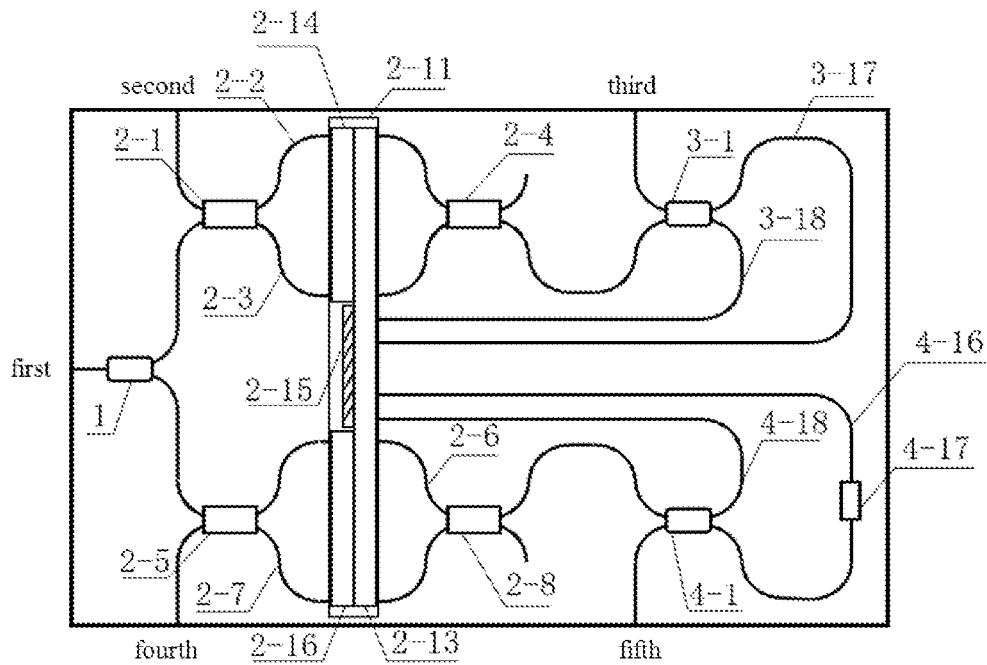
FIG. 5 is a principle block diagram of Embodiment four of an integrated self-coherent receiving optical chip based on round-trip delay interferometers according to the present application.

As shown in FIG. 5, Embodiment 4 of the integrated self-coherent receiving optical chip based on round-trip delay interferometers of the present application is as follows:
the structure of the integrated self-coherent receiving optical chip based on round-trip delay interferometers is that, the non-reciprocal polarization rotation module includes a second notch groove 2-11, a third half-wave plate 2-14, a fourth half-wave plate 2-16 and the first Faraday rotation plate 2-13;
the second notch groove 2-11 is configured to transversely run through the first optical waveguide 2-2, the second optical waveguide 2-3, the third optical waveguide 2-6, and the fourth optical waveguide 2-7;
the third half-wave plate 2-14 is aligned with one end of the first Faraday rotation plate 2-13 and closely attached to the first Faraday rotation plate 2-13 at a first side of the first Faraday rotation plate 2-13, and the fourth half-wave plate 2-16 is aligned with the other end of the first Faraday rotation plate 2-13 and closely attached to the first Faraday rotation plate at the first side of the first Faraday rotation plate 2-13, and is placed in the second notch groove 2-11;
the first Faraday rotation plate 2-13 is configured to transversely run through the first optical waveguide 2-2, the second optical waveguide 2-3, the third optical waveguide 2-6, and the fourth optical waveguide 2-7;
the third half-wave plate 2-14 is configured to transversely run through the first optical waveguide 2-2 and the second optical waveguide 2-3;
the fourth half-wave plate 2-16 is configured to transversely run through the third optical waveguide 2-6 and the fourth optical waveguide 2-7;
a first reflective film 2-15 is coated on the first side of the first Faraday rotation plate 2-13 attached to the third half-wave plate 2-14, at a gap between the third half-wave plate 2-14 and the fourth half-wave plate 2-16;
an angle between a main axis of the third half-wave plate 2-14 and the horizontal direction, and an angle between a main axis of the fourth half-wave plate 2-16 and the horizontal direction are both 22.5°, and a polarization rotation angle of the first Faraday rotation optical waveguide 2-13 is 45°;
the first round-trip delay interferometer 3 includes a second beam splitter 3-1, a nineteenth optical waveguide 3-17, and a twentieth optical waveguide 3-18;
the second round-trip delay interferometer 4 includes a third beam splitter 4-1, a twenty-first optical waveguide 4-16, a first phase shifter 4-17 and a twenty-second optical waveguide 4-18;
the nineteenth optical waveguide 3-17, the twentieth optical waveguide 3-18, the twenty-first optical waveguide 4-16 and the twenty-second optical waveguide 4-18 are all connected to a second side of the first Faraday rotation optical waveguide 2-13 at a part corresponding to the first reflective film 2-15;
a length difference between the nineteenth optical waveguide 3-17 and the twentieth optical waveguide 3-18 is equal to half of an arm length difference of the first round-trip delay interferometer 3; a length difference between the twenty-first optical waveguide 4-16 and the twenty-second optical waveguide 4-18 is equal to half of an arm length difference of the second round-trip delay interferometer 4;
the second beam splitter 3-1 is configured to split the first signal light component to generate a first component and a second component with the same amplitude;

the third beam splitter 4-1 is configured to split the second signal light component to generate two a third component and a fourth component with the same amplitude;

the first reflective film 2-15 and the first Faraday rotation optical waveguide 2-13 are together configured to rotate polarization states of the first component, the second component, the third component and the fourth component respectively by 90° and reflect the first component, the second component, the third component and the fourth component;

the first phase shifter 4-17 is configured to increase the third component by π/2 phase;

the second beam splitter 3-1 is further configured to interfere reflected first component and reflected second component to generate a first interference optical signal and a second interference optical signal; and the third beam splitter 4-1 is further configured to interfere reflected third component and reflected fourth component to generate a third interference optical signal and a fourth interference optical signal.

The specific working process of Embodiment four includes:

the signal light E(t) received by the receiving optical chip first enters the) first beam splitter 1 and is split into the first signal light component $E_1(t)$ and the second signal light component $E_2(t)$, satisfying $E_1(t)=E_2(t)=1/\sqrt{2}E(t)$. Since the polarization becomes random when the signal light passes through the fiber channel and reaches the receiving device, which can be expressed as $$E(t) = A(t)e^{j(\omega t+\varphi_0)}\begin{bmatrix} \cos\theta \\ \sin\theta e^{j\delta} \end{bmatrix},$$

wherein θ refers to an angle between the horizontal polarization component and the vertical polarization component of the signal light, and δ refers to the phase difference between the horizontal polarization component and the vertical polarization component of the signal light.

The first signal light component enters the first polarization beam splitting rotator 2-1 and is polarization split to generate the first polarization component of the first signal light and the second polarization component of the first signal light, both of which are TE polarization, and pass through the third half-wave plate 2-14 and the first Faraday rotation plate 2-13, successively, with the polarization state unchanged, and is polarization combined by the second polarization beam splitting rotator 2-4, recombined into the first signal light component. Then the recombined first signal light component reaches the second beam splitter 3-1, and the polarization state becomes $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix}.$$

Then the recombined first signal light component is divided into the first component $E_{11}(t)$ and the second component $E_{12}(t)$ with the same polarization by the second beam splitter 3-1. In particular, $E_{12}(t)$ passes through the nineteenth optical waveguide 3-17 and reaches the first Faraday rotation plate 2-13, then is reflected by the first reflection film 2-15, and passes through the first Faraday rotation plate 2-13 and the nineteenth optical waveguide 3-17 again; and the polarization state is rotated by 90°, which can be expressed as $$E_{11}(t) = \frac{A(t)e^{j(\omega t+\varphi_0)}}{2}\begin{bmatrix} -\sin\theta_1 e^{-j\delta_1} \\ \cos\theta_1 \end{bmatrix}.$$

$E_{12}(t)$ passes through the twentieth optical waveguide 3-18, and reaches the first Faraday rotation plate 2-13, then is reflected by the first reflection film 2-15, and passes through the first Faraday rotation plate 2-13 and the twentieth optical waveguide 3-18 again; and the polarization state is rotated by 90°, which can be expressed as $$E_{12}(t-\tau) = \frac{A(t-\tau)e^{j(\omega(t-\tau)+\varphi_0)}}{2}\begin{bmatrix} -\sin\theta_1 e^{-j\delta_1} \\ \cos\theta_1 \end{bmatrix}.$$

The two have the same polarization, and return to the second beam splitter 3-1 for interference, to generate the first interference optical signal and the second interference optical signal written respectively as $$E_{out1}(t) = \frac{e^{j(\omega t+\varphi_0)}}{2\sqrt{2}}[A(t)+A(t-\tau)e^{-j\omega\tau}]\begin{bmatrix} -\sin\theta_1 e^{-j\delta_1} \\ \cos\theta_1 \end{bmatrix}$$

$$E_{out2}(t) = \frac{e^{j(\omega t+\varphi_0)}}{2\sqrt{2}}[A(t)-A(t-\tau)e^{-j\omega\tau}]\begin{bmatrix} -\sin\theta_1 e^{-j\delta_1} \\ \cos\theta_1 \end{bmatrix},$$

wherein τ refers to the delay corresponding to an arm length difference between the first long arm and the first short arm of the first round-trip delay interferometer 3.

The first interference optical signal is output from a port of the second beam splitter 3-1 where the first signal light component enters, enters the output port of the second polarization beam splitting rotator 2-4, and is polarization split into two polarization components, both of which are TE polarization. And each of the two passes through the first Faraday rotation plate 2-13 and the third half-wave plate 2-14 successively, and the polarization state is rotated by 90°, to become TM polarization. The two are polarization combined by the first polarization beam splitting rotator 2-1, and the combined first interference optical signal is output from the other input port, and is finally output from the second port of the optical chip. The second interference optical signal is output from the other input port of the second beam splitter 3-1, and is finally output from the third port output of the optical chip.

The differential current signal generated by balanced detection of the first interference optical signal and the second interference optical signal respectively output from the second port of the optical chip and the third port of the optical chip is the in-phase component, which can be expressed as $$I_I(t) = R[|E_{out1}(t)|^2 - |E_{out2}(t)|^2] = \frac{R}{2}|E(t)||E(t-\tau)|\cos(\omega\tau)$$

$$= \frac{R}{2}A(t)A(t-\tau)\cos(\omega\tau)$$

wherein R refers to the response efficiency of the photoelectric detector, and ω refers to the angular frequency of the signal light. It can be seen that the self-interference in-phase component of the first signal light component has nothing to do with polarization.

The second signal light component enters the third polarization beam splitting rotator 2-5 and is polarization split into two polarization components, both of which are TE polarization, passes through the fourth half-wave plate 2-16 and the first Faraday rotation plate 2-13 successively, with the polarization state unchanged, and are polarization combined by the fourth polarization beam splitting rotator 2-8 into the second signal light component. Then the state becomes $$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix}.$$

Then the second signal light component undergoes polarization-independent delayed self-interference similar to that of the first signal light component, to generate a third interference optical signal $E_{out3}(t)$ and a fourth interference optical signal $E_{out4}(t)$. Since the first phase shifter 4-17 guarantees the phase difference between the long arm and the short arm is $\pi/2$, and the two can be expressed as $$E_{out3}(t) = \frac{e^{j(\omega t+\varphi_0)}}{2\sqrt{2}}\left[A(t) + jA(t-\tau)e^{-j\omega\tau}\right]\begin{bmatrix} -\sin\theta_2 e^{-j\delta_2} \\ \cos\theta_2 \end{bmatrix}$$

$$E_{out4}(t) = \frac{e^{j(\omega t+\varphi_0)}}{2\sqrt{2}}\left[A(t) - jA(t-\tau)e^{-j\omega\tau}\right]\begin{bmatrix} -\sin\theta_2 e^{-j\delta_2} \\ \cos\theta_2 \end{bmatrix},$$

wherein $\tau$ refers to the delay corresponding to an arm length difference between the second long arm and the second short arm of the second round-trip delay interferometer 4.

The third interference optical signal is output from the port of the third beam splitter 4-1 where the second signal light component enters, enters an output port of the fourth polarization beam splitting rotator 2-8, and is polarization split into two polarization components, both of which are TE polarization. Each of the two passes through the first Faraday rotation plate 2-13 and the fourth half-wave plate 2-16 successively, then the polarization state is rotated by 90°, to become TM polarization. The two polarization components are combined by the third polarization beam splitting rotator 2-5, then are output from the other input port, and finally outputs from a fourth port of the optical chip; the fourth interference optical signal is output from the other port of the third beam splitter 4-1, and is finally output from a fifth port of the optical chip.

The differential current signal generated by balanced detection of the third interference optical signal and the fourth interference optical signal respectively output from the fourth port of the optical chip and the fifth port of the optical chip is a quadrature phase component, which can be expressed as $$I_Q(t) = R[|E_{out3}(t)|^2 - |E_{out4}(t)|^2] = \frac{R}{2}|E(t)||E(t-\tau)|\sin(\omega\tau)$$

$$= \frac{R}{2}A(t)A(t-\tau)\sin(\omega\tau)$$

It can be seen that the self-interference quadrature phase component of the second signal light component is independent of polarization.

Finally, the electrical signals of the in-phase component and the quadrature phase component are synthesized into a complex signal, which can be expressed as $$u(t) = I_I(t) + jI_Q(t) = \frac{R}{2}E(t)E^*(t-\tau).$$

The complex signal above is sampled and digital signal processed, then electric field information of the signal light is recovered and a service data is obtained.

Figure 6:
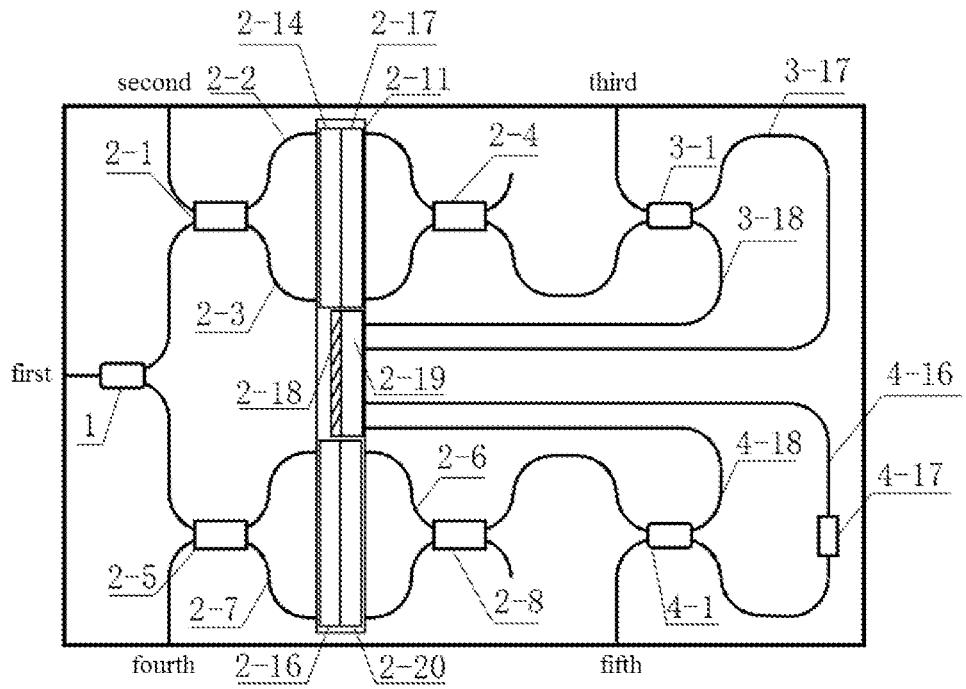
FIG. 6 is a principle block diagram of Embodiment five of an integrated self-coherent receiving optical chip based on round-trip delay interferometers according to the present application.

As shown in FIG. 6, Embodiment five of the integrated self-coherent receiving optical chip based on round-trip delay interferometers of the present application is as follows:

the structure of the integrated self-coherent receiving optical chip based on round-trip delay interferometers is that, the non-reciprocal polarization rotation module includes a second notch groove 2-11, a third half-wave plate 2-14, a fourth half-wave plate 2-16, a second Faraday optical rotator 2-17, a third Faraday optical rotator 2-20, a second reflection film 2-18 and a fourth quarter-wave plate 2-19.

The second notch groove 2-11 is configured to transversely run through the first optical waveguide 2-2, the second optical waveguide 2-3, the third optical waveguide 2-6, and the fourth optical waveguide 2-7;

the third half-wave plate 2-14 and the second Faraday optical rotator 2-17 have a same length, are aligned and attached to each other, and are located at one end of the second notch groove 2-11; the fourth half-wave plate 2-16 and the third Faraday optical rotator 2-20 have a same length, are aligned and attached to each other, and are located at the other end of the second notch groove 2-11;

the third half-wave plate 2-14 and the second Faraday rotation plate 2-17 are configured to transversely run through the first optical waveguide 2-2 and the second optical waveguide 2-3;

the fourth half-wave plate 2-16 and the third Faraday rotation plate 2-20 are configured to transversely run through the third optical waveguide 2-6 and the fourth optical waveguide 2-7;

the second reflective film 2-18 is coated on one side of the fourth quarter-wave plate where the third half-wave plate 2-14 and the fourth half-wave plate 2-16 are located, are located in a middle part of the second notch groove 2-11, and are aligned with the second Faraday rotation plate 2-17 and the third Faraday rotation plate 2-20;

an angle between a main axis of the third half-wave plate 2-14 and the horizontal direction, and an angle between a main axis of the fourth half-wave plate 2-16 and the horizontal direction are both 22.5°; the second Faraday rotation plate 2-17 and the third Faraday rotation plate 2-20 both have a polarization rotation angle of 45°; an angle between the main axis of the fourth quarter-wave plate 2-19 and the horizontal direction is 45°;

the first round-trip delay interferometer 3 includes a second beam splitter 3-1, a nineteenth optical waveguide 3-17, and a twentieth optical waveguide 3-18;

the second round-trip delay interferometer 4 includes a third beam splitter 4-1, a twenty-first optical waveguide 4-16, a first phase shifter 4-17 and a twenty-second optical waveguide 4-18;

the nineteenth optical waveguide 3-17, the twentieth optical waveguide 3-18, the twenty-first optical waveguide 4-16 and the twenty-second optical waveguide 4-18 are all connected to a second side of the first Faraday rotation optical waveguide 2-13 at a part corresponding to the first reflective film 2-15;

a length difference between the nineteenth optical waveguide 3-17 and the twentieth optical waveguide 3-18 is equal to half of an arm length difference of the first round-trip delay interferometer 3; a length difference between the twenty-first optical waveguide 4-16 and the twenty-second optical waveguides 4-18 is equal to half of an arm length difference of the second round-trip delay interferometer 4;

the second beam splitter 3-1 is configured to split the first signal light component to generate a first component and a second component with the same amplitude;

the third beam splitter 4-1 is configured to split the second signal light component to generate a third component and a fourth component with the same amplitude;

The second reflective film 2-18 and the fourth quarter-wave plate 2-19 are together configured to correspondingly change horizontal polarization components and vertical polarization components of the polarization states of the first component, the second component, the third component and the fourth component, as the vertical polarization components and the horizontal polarization components, respectively, and reflects changed vertical polarization components and horizontal polarization components;

the first phase shifter 4-17 is configured to increase the third component by $\pi/2$ phase;

The second beam splitter 3-1 is further configured to interfere reflected first component and reflected second component to generate a first interference optical signal and a second interference optical signal, and the first interference optical signal and the second interference optical signal are correspondingly output from the input port where the first signal light component is input and the other input port; and the third beam splitter 4-1 is further configured to interfere reflected third component and reflected fourth component to generate a third interference optical signal and a fourth interference optical signal, and the third interference optical signal and the fourth interference optical signal are correspondingly output from the input port where the second signal light component is input and the other input port.

The specific working process of Embodiment five includes:

the signal light E(t) received by the receiving optical chip first enters the first beam splitter 1 and is split into the first signal light component $E_1(t)$ and the second signal light component $E_2(t)$, satisfying $E_1(t)=E_2(t)=1/\sqrt{2}E(t)$. Since the polarization becomes random when the signal light passes through the fiber channel and reaches the receiving device, which can be expressed as $$E(t) = A(t)e^{j(\omega t+\varphi_0)}\begin{bmatrix} \cos\theta \\ \sin\theta e^{j\delta} \end{bmatrix},$$

wherein $\theta$ refers to an angle between the horizontal polarization component and the vertical polarization component of the signal light, and $\delta$ refers to the phase difference between the horizontal polarization component and the vertical polarization component of the signal light.

The first signal light component enters the first polarization beam splitting rotator 2-1 and is polarization split to generate a first polarization component of the first signal light and a second polarization component of the first signal light, both of which are TE polarization. And each of the two passes through the third half-wave plate 2-14 and the second Faraday rotation plate 2-17, with the polarization state unchanged, and is polarization combined by the second polarization beam splitting rotator 2-4, recombined into the first signal light component. Then the recombined first signal light component reaches the second beam splitter 3-1, and the polarization state becomes $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix}.$$

Then it is split into the first component $E_{11}(t)$ and the second component $E_{12}(t)$ with the same polarization by the second beam splitter 3-1, in which $E_{11}(t)$ passes through the nineteenth optical waveguide 3-17 and reaches the fourth quarter-wave plate 2-19, then is reflected by the second reflective film 2-18, and passes through the fourth quarter-wave plate 2-19 and the nineteenth optical waveguide 3-17 again. The horizontal polarization component and the vertical polarization component are exchanged, which can be expressed as $$E_{11}(t) = \frac{A(t)e^{j(\omega t+\varphi_0)}}{2}\begin{bmatrix} \sin\theta_1 e^{j\delta_1} \\ \cos\theta_1 \end{bmatrix}.$$

$E_{12}(t)$ passes through the twentieth optical waveguide 3-18 and reaches the fourth quarter-wave plate 2-19, then is reflected by the second reflection film 2-18, and passes through the fourth quarter-wave plate 2-19 and the twentieth optical waveguide 3-18 again. The horizontal polarization component and the vertical polarization component are exchanged, which can be expressed as $$E_{12}(t-\tau) = \frac{A(t-\tau)e^{j(\omega(t-\tau)+\varphi_0)}}{2}\begin{bmatrix} \sin\theta_1 e^{j\delta_1} \\ \cos\theta_1 \end{bmatrix}.$$

The two have a same polarization, and interfere at the second beam splitter 3-1, and the generated first interference optical signal $E_{out1}(t)$ and the second interference optical signal $E_{out2}(t)$ can be respectively expressed as $$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}$$

$$E_{out2}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix},$$

wherein $\tau$ refers to the delay corresponding to an arm length difference between the first long arm and the first short arm of the first round-trip delay interferometer 3.

The first interference optical signal is output from a port of the second beam splitter 3-1 where the first signal light component enters, enters the output port of the second polarization beam splitting rotator 2-4, and is polarization split into two polarization components, both of which are TE polarization. And each of the two passes through the second Faraday rotation plate 2-17 and the third half-wave plate 2-14 successively, and the polarization state is rotated by 90°, to become TM polarization. The two are polarization combined by the first polarization beam splitting rotator 2-1, and the combined first interference optical signal is output from the other input port, and is finally output from the second port of the optical chip. The second interference optical signal is output from the other input port of the second beam splitter 3-1, and is finally output from the third port output of the optical chip.

The differential current signal generated by balanced detection of the first interference optical signal and the second interference optical signal respectively output from the second port of the optical chip and the third port of the optical chip is the in-phase component, which can be expressed as $$I_I(t) = R\left[|E_{out1}(t)|^2 - |E_{out2}(t)|^2\right] = \frac{R}{2}|E(t)||E(t-\tau)|\cos(\omega\tau) = \frac{R}{2}A(t)A(t-\tau)\cos(\omega\tau),$$

wherein R refers to the response efficiency of the photoelectric detector, and ω refers to the angular frequency of the signal light. It can be seen that the self-interference in-phase component of the first signal light component has nothing to do with polarization.

The second signal light component enters the third polarization beam splitting rotator 2-5 and is polarization split into two polarization components, both of which are TE polarization, passes through the fourth half-wave plate 2-16 and the third Faraday rotation plate 2-20 successively, with the polarization state unchanged, and are polarization combined by the fourth polarization beam splitting rotator 2-8 into the second signal light component. Then the recombined second signal light component reaches the third beam splitter 4-1, and the polarization state becomes $$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix}.$$

Then the second signal light component undergoes polarization-independent delayed self-interference similar to that of the first signal light component, to generate a third interference optical signal $E_{out3}(t)$ and a fourth interference optical signal $E_{out4}(t)$. Since the first phase shifter 4-17 guarantees the phase difference between the long arm and the short arm is π/2, and the two can be expressed as $$E_{out3}(t) = \frac{e^{j(\omega t+\varphi_0)}}{2\sqrt{2}}\left[A(t)+jA(t-\tau)e^{-j\omega\tau}\right]\begin{bmatrix} -\sin\theta_2 e^{-j\delta_2} \\ \cos\theta_2 \end{bmatrix}$$

$$E_{out4}(t) = \frac{e^{j(\omega t+\varphi_0)}}{2\sqrt{2}}\left[A(t)+jA(t-\tau)e^{-j\omega\tau}\right]\begin{bmatrix} -\sin\theta_2 e^{-j\delta_2} \\ \cos\theta_2 \end{bmatrix},$$

wherein τ refers to the delay corresponding to an arm length difference between the second long arm and the second short arm of the second round-trip delay interferometer 4.

The third interference optical signal is output from the port of the third beam splitter 4-1 where the second signal light component enters, enters an output port of the fourth polarization beam splitting rotator 2-8, and is polarization split into two polarization components, both of which are TE polarization. Each of the two passes through the third Faraday rotation plate 2-20 and the fourth half-wave plate 2-16 successively, then the polarization state is rotated by 90°, to become TM polarization. The two polarization components are combined by the third polarization beam splitting rotator 2-5, then are output from the other input port, and finally outputs from a fourth port of the optical chip; the fourth interference optical signal is output from the other port of the third beam splitter 4-1, and is finally output from a fifth port of the optical chip.

The differential current signal generated by balanced detection of the third interference optical signal and the fourth interference optical signal respectively output from the fourth port of the optical chip and the fifth port of the optical chip is a quadrature phase component, which can be expressed as $$I_Q(t) = R\left[|E_{out3}(t)|^2 - |E_{out4}(t)|^2\right] = \frac{R}{2}|E(t)||E(t-\tau)|\sin(\omega\tau) = \frac{R}{2}A(t)A(t-\tau)\sin(\omega\tau).$$

It can be seen that the self-interference quadrature phase component of the second signal light component is independent of polarization.

Finally, the electrical signals of the in-phase component and the quadrature phase component are synthesized into a complex signal, which can be expressed as $$u(t) = I_I(t) + jI_Q(t) = \frac{R}{2}E(t)E^*(t-\tau).$$

The complex signal above is sampled and digital signal processed, then electric field information of the signal light is recovered and a service data is obtained.

From various embodiments of the present application, it can be seen that the present application provides an integrated self-coherent receiving optical chip based on round-trip delay interferometers, in which a multi-port circulator array is integrated with two round-trip delay interferometers, which can realize a self-coherent reception of polarization-independent signal light, without an active polarization control, eliminating the influence of random changes in the polarization state of the signal light on the receiver, and improving the stability of the receiving device. Moreover, the receiving device only needs two delay interferometers and two sets of balanced detectors, which reduces the difficulty and complexity of processing of electronic signal received and detected, so the complexity of the receiving end can be greatly reduced. At the same time, the technical solution of the present application can be applied not only to optical communication systems, but also to continuous variable quantum key distribution systems and sensor systems, and has high versatility and practicability.

What is claimed is:

1. An integrated self-coherent receiving optical chip based on round-trip delay interferometers, comprising: a first beam splitter, a multi-port circulator array, a first round-trip delay interferometer and a second round-trip delay interferometer, which are integrated on a same substrate, wherein, the first beam splitter is configured to split a signal light input to a first port of the integrated self-coherent receiving optical chip to generate a first signal light component and a second signal light component;

the multi-port circulator array is configured to transmit the first signal light component input to a first port of the multi-port circulator array to a second port of the multi-port circulator array to be output; and transmit the second signal light component input to a fourth port of the multi-port circulator array to a fifth port of the multi-port circulator array to be output;

the first round-trip delay interferometer has a first long arm and a first short arm, the first long arm and the first short arm are configured to perform a round-trip transmission of the first signal light component input to a first port of the first round-trip delay interferometer, and perform a delayed self-interference before returning to the first port of the first round-trip delay interferometer, to generate a first interference optical signal and a second interference optical signal to be output from the first port of the first round-trip delay interferometer and a second port of the first round-trip delay interferometer respectively;

the second round-trip delay interferometer has a second long arm and a second short arm, a phase difference between the second long arm and the second short arm is $\pi/2$, and the second long arm and the second short arm are configured to perform a round-trip transmission of the second signal light component input to a first port of the second round-trip delay interferometer, and perform a delayed self-interference before returning to the first port of the second round-trip delay interferometer, to generate a third interference optical signal and a fourth interference optical signal to be output from the first port of the second round-trip delay interferometer and a second port of the second round-trip delay interferometer respectively;

the multi-port circulator array is further configured to transmit the first interference optical signal input to the second port of the multi-port circulator array to a third port of the multi-port circulator array, and output the first interference optical signal from a second port of the integrated self-coherent receiving optical chip; and transmit the third interference optical signal input to the fifth port of the multi-port circulator array to a sixth port of the multi-port circulator array, and output the third interference optical signal from a fourth port of the integrated self-coherent receiving optical chip;

the multi-port circulator array comprises a first polarization beam splitting rotator, a first optical waveguide, a second optical waveguide, a second polarization beam splitting rotator, a third polarization beam splitting rotator, a third optical waveguide, a fourth optical waveguide, a fourth polarization beam splitting rotator and non-reciprocal polarization rotation modules, each of the first optical waveguide, the second optical waveguide, the third optical waveguide, and the fourth optical waveguide comprises one of the non-reciprocal polarization rotation modules; each of the non-reciprocal polarization rotation modules is configured to rotate a polarization state of an optical signal passing from one direction by 90° and keep a polarization state of an optical signal passing from other direction unchanged;

the first polarization beam splitting rotator is configured to perform a polarization beam splitting on the first signal light component input to one input port of the first polarization beam splitting rotator to generate a first polarization component and a second polarization component of the first signal light component;

the second polarization beam splitting rotator is configured to perform a polarization beam combining on the first polarization component and the second polarization component of the first signal light component passing through the non-reciprocal polarization rotation modules in a forward direction, to recombine the first polarization component and the second polarization component of the first signal light component into the first signal light component; and configured to perform a polarization beam splitting on the first interference optical signal to generate a first polarization component and a second polarization component of the first interference optical signal;

the first polarization beam splitting rotator is further configured to perform a polarization beam combining on the first polarization component and the second polarization component of the first interference optical signal passing through the non-reciprocal polarization rotation modules in a reverse direction, to recombine the first polarization component and the second polarization component of the first interference optical signal into the first interference optical signal to be output from another input port of the first polarization beam splitting rotator;

the third polarization beam splitting rotator is configured to perform a polarization beam splitting on the second signal light component input to one input port of the third polarization beam splitting rotator to generate a first polarization component and a second polarization component of the second signal light component;

the fourth polarization beam splitting rotator is configured to perform a polarization beam combining on the first polarization component and the second polarization component of the second signal light component passing through the non-reciprocal polarization rotation modules in the forward direction, to recombine the first polarization component and the second polarization component of the second signal light component into the second signal light component; and perform a polarization beam splitting on the third interference optical signal to generate a first polarization component and a second polarization component of the third interference optical signal;

the third polarization beam splitting rotator is further configured to perform a polarization beam combining on the first polarization component and the second polarization component of the third interference optical signal passing through the non-reciprocal polarization rotation modules in the reverse direction, to recombine the first polarization component and the second polarization component of the third interference optical signal into the third interference optical signal to be output from another input port of the third polarization beam splitting rotator; and wherein, the signal light $E(t)$ received by the integrated self-coherent receiving optical chip first enters the first beam splitter to be split into the first signal light component $E_1(t)$ and the second signal light component $E_2(t)$, which satisfy $E_1(t)=E_2(t)$ =1/√2E(t), wherein the first signal light component enters the first port of the multi-port circulator array, is output from the second port of the multi-port circulator array, reaches the first port of the first round-trip delay interferometer for the round-trip transmission, and completes the delayed self-interference before returning to the first port of the first round-trip delay interferometer, to generate to the first interference optical signal $E_{out1}(t)$ and the second interference optical signal $E_{out2}(t)$, which are respectively expressed as:

$$E_{out1}(t) = \frac{1}{2\sqrt{2}}[E(t) + E(t-\tau)]$$

$$E_{out2}(t) = \frac{1}{2\sqrt{2}}[E(t) - E(t-\tau)],$$

wherein τ refers to a delay corresponding to an arm length difference between a long arm and a short arm of a first polarization-independent delay interferometer;

the first interference optical signal is output from the first port of the first round-trip delay interferometer into which the first signal light component enters, enters the second port of the multi-port circulator array, is output from the third port of the multi-port circulator array, and is output from the second port of the integrated self-coherent receiving optical chip; the second interference optical signal is output from the second port of the first round-trip delay interferometer, and is output from a third port of the integrated self-coherent receiving optical chip;

a differential current signal is generated by performing a balanced detection on the first interference optical signal and the second interference optical signal respectively output from the second port of the integrated self-coherent receiving optical chip and the third port of the integrated self-coherent receiving optical chip, which is an in-phase component and is expressed as:

$$I_I(t) = \frac{R}{2}|E(t)||E(t-\tau)|\cos(\omega\tau),$$

wherein R refers to a response efficiency of a photoelectric detector, ω refers to an angular frequency of the signal light;

the second signal light component enters the fourth port of the multi-port circulator array, is output from the second port of the multi-port circulator array and reaches the first port of the second round-trip delay interferometer for the round-trip transmission, and completes delay self-interference before returning to the first port of the second round-trip delay interferometer; with the phase difference π/2 between the second long arm and the second short arm of the second round-trip delay interferometer, the third interference optical signal $E_{out3}$ (t) and the fourth interference optical signal $E_{out4}$ (t) are respectively expressed as:

$$E_{out3}(t) = \frac{1}{2\sqrt{2}}[E(t) + jE(t-\tau)]$$

$$E_{out4}(t) = \frac{1}{2\sqrt{2}}[E(t) - jE(t-\tau)],$$

wherein τ refers to a delay corresponding to an arm length difference between a long arm and a short arm of a second polarization-independent delay interferometer, the third interference optical signal is output from the first port of the second round-trip delay interferometer into which the second signal light component enters, enters the fifth port of the multi-port circulator array, and is output from the sixth port of the multi-port circulator array, and is output from the fourth port of the integrated self-coherent receiving optical chip; the fourth interference optical signal is output from the second port of the second round-trip delay interferometer, and is output from a fifth port of the integrated self-coherent receiving optical chip, a second differential current signal is generated by performing the balanced detection on the third interference optical signal and the fourth interference optical signal respectively output from the fourth port of the integrated self-coherent receiving optical chip and the fifth port of the integrated self-coherent receiving optical chip, which is a quadrature phase component and is expressed as:

$$I_Q(t) = \frac{R}{2}|E(t)||E(t-\tau)|\sin(\omega\tau),$$

an electrical signal of the in-phase component and an electrical signal of the quadrature phase component are synthesized into a complex signal, which is expressed as:

$$u(t) = I_I(t) + jI_Q(t) = \frac{R}{2}E(t)E^*(t-\tau),$$

the complex signal is sampled and digitized to recover electric field information of the signal light and obtain service data.

2. The integrated self-coherent receiving optical chip based on round-trip delay interferometers according to claim 1, wherein, the first round-trip delay interferometer comprises a second beam splitter, a fifth optical waveguide, a first delayed optical waveguide, a sixth optical waveguide and a fifth polarization beam splitting rotator;

the second beam splitter is configured to split the first signal light component to generate a first component and a second component with same amplitude;

the first delayed optical waveguide is configured to delay the first component by a length of half of an arm length difference of the first round-trip delay interferometer;

two output ports of the fifth polarization beam splitting rotator are directly connected by an optical waveguide, and are configured to reflect the first component from an incident port of the first component, and change a horizontal polarization component and a vertical polarization component of the first component into a vertical polarization component and a horizontal polarization component of the first component respectively; and configured to reflect the second component from an incident port of the second component, and change a horizontal polarization component and a vertical polarization component of the second component into a vertical polarization component and a horizontal polarization component of the second component respectively;

the second beam splitter is further configured to interfere the reflected first component and the reflected second component to generate the first interference optical signal and the second interference optical signal;

the second round-trip delay interferometer comprises a third beam splitter, a seventh optical waveguide, a second delayed optical waveguide, an eighth optical waveguide, a sixth polarization beam splitting rotator and a first quarter-wave plate, wherein, an angle between a main axis of the first quarter-wave plate and a horizontal direction is 0°;

the third beam splitter is configured to split the second signal light component to generate a third component and a fourth component with a same amplitude;

the second delayed optical waveguide is configured to delay the third component by a length of half of an arm length difference of the second round-trip delay interferometer;

two output ports of the sixth polarization beam splitting rotator are directly connected by another optical waveguide, and are configured to reflect the third component from an incident port of the third component, and change a horizontal polarization component and a vertical polarization component of the third component into a vertical polarization component and a horizontal polarization component of the third component, respectively; and configured to reflect the fourth component from an incident port of the fourth component, and change a horizontal polarization component and a vertical polarization component of the fourth component into a vertical polarization component and a horizontal polarization component of the fourth component, respectively;

the another optical waveguide directly connecting the two output ports of the sixth polarization beam splitting rotator is provided with the first quarter-wave plate that is configured to increase the fourth component by $\pi/2$ phase, and not increase a phase of the third component; and the third beam splitter is further configured to interfere the reflected third component and the reflected fourth component to generate the third interference optical signal and the fourth interference optical signal.

3. The integrated self-coherent receiving optical chip based on round-trip delay interferometers according to claim 1, wherein, the first round-trip delay interferometer comprises a second beam splitter, a ninth optical waveguide, a tenth optical waveguide, a seventh polarization beam splitting rotator and a eighth polarization beam splitting rotator, a length difference between the ninth optical waveguide and the tenth optical waveguide is half of an arm length difference of the first round-trip delay interferometer;

the second beam splitter is configured to split the first signal light component to generate a first component and a second component with a same amplitude;

two output ports of the seventh polarization beam splitting rotator are directly connected by an optical waveguide, and are configured to reflect the first component from a first input port of the seventh polarization beam splitting rotator, and change a horizontal polarization component and a vertical polarization component of the first component into the vertical polarization component and the horizontal polarization component of the first component, respectively;

two output ports of the eighth polarization beam splitting rotator are directly connected by another optical waveguide, and are configured to reflect the second component from one of input ports of the eighth polarization beam splitting rotator, and change a horizontal polarization component and a vertical polarization component of the second component into the vertical polarization component and the horizontal polarization component of the second component, respectively;

the second beam splitter is further configured to interfere the reflected first component and the reflected second component to generate the first interference optical signal and the second interference optical signal;

the second round-trip delay interferometer comprises a third beam splitter, an eleventh optical waveguide, a twelfth optical waveguide, a second quarter-wave plate, and the seventh polarization beam splitting rotator and the eighth polarization beam splitting rotator shared with the first round-trip delay interferometer, an angle between a main axis of the second quarter-wave plate and a horizontal direction is 0°;

a length difference between the eleventh optical waveguide and the twelfth optical waveguide is half of an arm length difference of the second round-trip delay interferometer;

the third beam splitter is configured to split the second signal light component to generate a third component and a fourth component with a same amplitude;

the seventh polarization beam splitting rotator is further configured to reflect the third component from a second input port of the seventh polarization beam splitting rotator, and change a horizontal polarization component and a vertical polarization component of the third component into the vertical polarization component and the horizontal polarization component of the third component, respectively;

the eighth polarization beam splitting rotator is further configured to reflect the fourth component from a second input port of the eighth polarization beam splitting rotator, and change a horizontal polarization component and a vertical polarization component of the fourth component into the vertical polarization component and the horizontal polarization component of the fourth component, respectively;

the another optical waveguide directly connecting the two output ports of the eighth polarization beam splitting rotator is also provided with the second quarter-wave plate configured to increase the fourth component by $\pi/2$ phase, and not increase a phase of the third component; and the third beam splitter is further configured to interfere the reflected third component and the reflected fourth component to generate the third interference optical signal and the fourth interference optical signal.

4. The integrated self-coherent receiving optical chip based on round-trip delay interferometers according to claim 1, wherein the first round-trip delay interferometer comprises a ninth polarization beam splitting rotator, a thirteenth optical waveguide, a fourteenth optical waveguide, a first polarization beam splitter and a fifteenth optical waveguide, wherein, the fifteenth optical waveguide has a length equal to an arm length difference of the first round-trip delay interferometer;

the second round-trip delay interferometer comprises a tenth polarization beam splitting rotator, a sixteenth optical waveguide, a seventeenth optical waveguide, a second polarization beam splitter, an eighteenth optical waveguide and a third quarter-wave plate, the eighteenth optical waveguide has a length equal to an arm length difference of the second round-trip delay interferometer;

an angle between a main axis of the third quarter-wave plate and a horizontal direction is 0°;

a first notch groove is provided transversely through the thirteenth optical waveguide, the fourteenth optical waveguide, the sixteenth optical waveguide, and the seventeenth optical waveguide; a first half-wave plate is inserted into the first notch groove, and an angle between a main axis of the first half-wave plate and the horizontal direction is 22.5°;

the ninth polarization beam splitting rotator is configured to perform a polarization beam splitting on the first signal light component to generate a first polarization beam splitting component and a second polarization beam splitting component;

the tenth polarization beam splitting rotator is configured to perform a polarization beam splitting on the second signal light component to generate a third polarization beam splitting component and a fourth polarization beam splitting component;

the first half-wave plate is configured to rotate a polarization state of a passing optical signal by 45°;

the first polarization beam splitter is configured to transmit a horizontal polarization component of a first polarization beam splitting component incident from a first input port of the first polarization beam splitter to the fifteenth optical waveguide and reflect a vertical polarization component of the first polarization beam splitting component incident from the first input port of the first polarization beam splitter to the fifteenth optical waveguide, so that both of the horizontal polarization component and the vertical polarization component of the first polarization beam splitting component incident from the first input port of the first polarization beam splitter are output from a second input port of the first polarization beam splitter for a polarization combination to generate a first polarization synthesized optical signal; and configured to transmit a horizontal polarization component of a second polarization beam splitting component incident from the second input port of the first polarization beam splitter to the fifteenth optical waveguide and reflect a vertical polarization component of the second polarization beam splitting component incident from the second input port of the first polarization beam splitter to the fifteenth optical waveguide, so that both of the horizontal polarization component and the vertical polarization component of the second polarization beam splitting component incident from the second input port of the first polarization beam splitter are output from the first input port of the first polarization beam splitter for a polarization combination to generate a second polarization synthesized optical signal;

the second polarization beam splitter is configured to transmit a horizontal polarization component of a third polarization beam splitting component incident from a first input port of the second polarization beam splitter to the sixteenth optical waveguide and reflect a vertical polarization component of the third polarization beam splitting component incident from the first input port of the second polarization beam splitter to the sixteenth optical waveguide, so that both of the horizontal polarization component and the vertical polarization component of the third polarization beam splitting component incident from the first input port of the second polarization beam splitter are output from a second input port of the second polarization beam splitter for a polarization combination to generate a third polarization synthesized optical signal; and configured to transmit a horizontal polarization component of the fourth polarization beam splitting component incident from a second input port of the second polarization beam splitter to the sixteenth optical waveguide and reflect a vertical polarization component of the fourth polarization beam splitting component incident from the second input port of the second polarization beam splitter to the sixteenth optical waveguide, so that both of the horizontal polarization component and the vertical polarization component of the fourth polarization beam splitting component incident from the second input port of the second polarization beam splitter are output from the first input port of the second polarization beam splitter for a polarization combination to generate a fourth polarization synthesized optical signal;

the third quarter-wave plate is configured to increase the vertical polarization component of the third polarization beam splitting component and the vertical polarization component of the fourth polarization beam splitting component passing through the third quarter-wave plate by $\pi/2$ phase;

the ninth polarization beam splitting rotator is further configured to perform a polarization beam combining on a horizontal polarization component of the first polarization synthesized optical signal and a horizontal polarization component of the second polarization synthesized optical signal to generate the first interference optical signal; and perform a polarization beam combining on a vertical polarization component of the first polarization synthesized optical signal and a vertical polarization component of the second polarization synthesized optical signal to generate the second interference optical signal; and the tenth polarization beam splitting rotator is configured to perform a polarization beam combining on a horizontal polarization component of the third polarization synthesized optical signal and a horizontal polarization component of the fourth polarization synthesized optical signal to generate the third interference optical signal; and perform a polarization beam combining on a vertical polarization component of the third polarization synthesized optical signal and a vertical polarization component of the fourth polarization synthesized optical signal to generate the fourth interference optical signal.

5. The integrated self-coherent receiving optical chip based on round-trip delay interferometers according to claim 1, wherein the non-reciprocal polarization rotation modules comprise four identical polarization rotation optical waveguides, and wherein each of the four identical polarization rotation optical waveguides comprises a half-wave plate optical waveguide and a Faraday rotation optical waveguide that are closely connected; a polarization rotation angle of each of the Faraday rotation optical waveguides is 45°; and each of the first optical waveguide, the second optical waveguide, the third optical waveguide, and the fourth optical waveguide comprises a polarization rotation optical waveguide.

6. The integrated self-coherent receiving optical chip based on round-trip delay interferometers according to claim 1, wherein the non-reciprocal polarization rotation modules comprise a second notch groove, a second half-wave plate and a first Faraday rotation plate, and wherein the second notch groove is configured to transversely run through the first optical waveguide, the second optical waveguide, the third optical waveguide, and the fourth optical waveguide;
- the second half-wave plate and the first Faraday rotation plate are aligned and tightly attached, and are placed in the second notch groove; and
- an angle between a main axis of the second half-wave plate and a horizontal direction is 22.5°, and a polarization rotation angle of a Faraday rotation optical waveguide is 45°.

7. The integrated self-coherent receiving optical chip based on round-trip delay interferometers according to claim 1, wherein the non-reciprocal polarization rotation modules comprise a second notch groove, a third half-wave plate, a fourth half-wave plate and a first Faraday rotation plate, and
- wherein the second notch groove is configured to transversely run through the first optical waveguide, the second optical waveguide, the third optical waveguide, and the fourth optical waveguide;
- the third half-wave plate is aligned with one end of the first Faraday rotation plate and attached to the first Faraday rotation plate at a first side of the first Faraday rotation plate; and the fourth half-wave plate is aligned with a second end of the first Faraday rotation plate and attached to the first Faraday rotation plate at the first side of the first Faraday rotation plate, and is placed in the second notch groove;
- the first Faraday rotation plate is configured to transversely run through the first optical waveguide, the second optical waveguide, the third optical waveguide, and the fourth optical waveguide;
- the third half-wave plate is configured to transversely run through the first optical waveguide and the second optical waveguide;
- the fourth half-wave plate is configured to transversely run through the third optical waveguide and the fourth optical waveguide;
- a first reflective film is coated on the first side of the first Faraday rotation plate where the third half-wave plate is attached to, and at a gap between the third half-wave plate and the fourth half-wave plate;
- an angle between a main axis of the third half-wave plate and a horizontal direction, and an angle between a main axis of the fourth half-wave plate and the horizontal direction are both 22.5°, and a polarization rotation angle of a first Faraday rotation optical waveguide is 45°;
- the first round-trip delay interferometer comprises a second beam splitter, a nineteenth optical waveguide, and a twentieth optical waveguide;
- the second round-trip delay interferometer comprises a third beam splitter, a twenty-first optical waveguide, a first phase shifter and a twenty-second optical waveguide,
- the nineteenth optical waveguide, the twentieth optical waveguide, the twenty-first optical waveguide and the twenty-second optical waveguide are all connected to a second side of the first Faraday rotation optical waveguide at a part corresponding to the first reflective film;
- a length difference between the nineteenth optical waveguide and the twentieth optical waveguide is equal to half of an arm length difference of the first round-trip delay interferometer; a length difference between the twenty-first optical waveguide and the twenty-second optical waveguide is equal to half of an arm length difference of the second round-trip delay interferometer;
- the second beam splitter is configured to split the first signal light component to generate a first component and a second component with a same amplitude;
- the third beam splitter is configured to split the second signal light component to generate a third component and a fourth component with a same amplitude;
- the first reflective film and the first Faraday rotation optical waveguide are together configured to rotate polarization states of the first component, the second component, the third component and the fourth component respectively by 90° and reflect the first component, the second component, the third component and the fourth component;
- the first phase shifter is configured to increase the third component by $\pi/2$ phase;
- the second beam splitter is further configured to interfere the reflected first component and the reflected second component to generate the first interference optical signal and the second interference optical signal; and
- the third beam splitter is further configured to interfere the reflected third component and the reflected fourth component to generate the third interference optical signal and the fourth interference optical signal.

8. The integrated self-coherent receiving optical chip based on round-trip delay interferometers according to claim 1, wherein the non-reciprocal polarization rotation modules comprise a second notch groove, a third half-wave plate, a fourth half-wave plate, a second Faraday rotation plate, a third Faraday rotation plate, a second reflective film and a fourth quarter-wave plate,
- the second notch groove is configured to transversely run through the first optical waveguide, the second optical waveguide, the third optical waveguide, and the fourth optical waveguide;
- the third half-wave plate and the second Faraday rotation plate have a same length, are aligned and attached to each other, and are located at one end of the second notch groove; the fourth half-wave plate and the third Faraday rotation plate have a same length, are aligned and attached to each other, and are located at a second end of the second notch groove;
- the third half-wave plate and the second Faraday rotation plate are configured to transversely run through the first optical waveguide and the second optical waveguide;
- the fourth half-wave plate and the third Faraday rotation plate are configured to transversely run through the third optical waveguide and the fourth optical waveguide;
- the second reflective film is coated on one side of the fourth quarter-wave plate where the third half-wave plate and the fourth half-wave plate are located, are located in a middle part of the second notch groove, and are aligned with the second Faraday rotation plate and the third Faraday rotation plate;
- an angle between a main axis of the third half-wave plate and a horizontal direction, and an angle between a main axis of the fourth half-wave plate and the horizontal direction are both 22.5°; the second Faraday rotation plate and the third Faraday rotation plate both have a polarization rotation angle of 45°; an angle between a main axis of the fourth quarter-wave plate and the horizontal direction is 45°;

the first round-trip delay interferometer comprises a second beam splitter, a nineteenth optical waveguide, and a twentieth optical waveguide;

the second round-trip delay interferometer comprises a third beam splitter, a twenty-first optical waveguide, a first phase shifter and a twenty-second optical waveguide, the nineteenth optical waveguide, the twentieth optical waveguide, the twenty-first optical waveguide and the twenty-second optical waveguide are all connected to a second side of a first Faraday rotation optical waveguide at a part corresponding to a first reflective film;

a length difference between the nineteenth optical waveguide and the twentieth optical waveguide is equal to half of an arm length difference of the first round-trip delay interferometer; a length difference between the twenty-first optical waveguide and the twenty-second optical waveguide is equal to half of an arm length difference of the second round-trip delay interferometer;

the second beam splitter is configured to split the first signal light component to generate a first component and a second component with a same amplitude;

the third beam splitter is configured to split the second signal light component to generate a third component and a fourth component with a same amplitude;

the second reflective film and the fourth quarter-wave plate are together configured to correspondingly change horizontal polarization components and vertical polarization components of polarization states of the first component, the second component, the third component and the fourth component into vertical polarization components and horizontal polarization components, respectively, and reflect the changed vertical polarization components and horizontal polarization components;

the first phase shifter is configured to increase the third component by $\pi/2$ phase;

the second beam splitter is further configured to interfere the reflected first component and the reflected second component to generate the first interference optical signal and the second interference optical signal; and the third beam splitter is further configured to interfere the reflected third component and the reflected fourth component to generate the third interference optical signal and the fourth interference optical signal.

\* \* \* \* \*